(12) United States Patent
Pfeiffer

(10) Patent No.: US 8,440,770 B2
(45) Date of Patent: May 14, 2013

(54) COMPOSITIONS COMPRISING SILOXANE COPOLYMERS

(75) Inventor: Juergen Pfeiffer, Mehring (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 13/509,942

(22) PCT Filed: Nov. 16, 2010

(86) PCT No.: PCT/EP2010/067519
§ 371 (c)(1),
(2), (4) Date: May 15, 2012

(87) PCT Pub. No.: WO2011/061161
PCT Pub. Date: May 26, 2011

(65) Prior Publication Data
US 2012/0232217 A1   Sep. 13, 2012

(30) Foreign Application Priority Data

Nov. 18, 2009 (DE) .......................... 10 2009 046 850

(51) Int. Cl.
*C08G 77/26* (2006.01)
(52) U.S. Cl.
USPC ........................................... 525/474; 528/28

(58) Field of Classification Search ...... 528/28; 525/474
See application file for complete search history.

(56) References Cited

U.S. PATENT DOCUMENTS

| | | | | |
|---|---|---|---|---|
| 5,221,724 | A * | 6/1993 | Li et al. | 528/28 |
| 6,441,118 | B2 * | 8/2002 | Sherman et al. | 528/28 |
| 6,652,916 | B1 * | 11/2003 | Baumgart et al. | 427/385.5 |
| 6,753,386 | B1 * | 6/2004 | Yahkind et al. | 525/458 |
| 6,815,069 | B2 * | 11/2004 | Hohberg et al. | 428/423.1 |
| 6,846,893 | B1 * | 1/2005 | Sherman et al. | 528/28 |
| 7,026,424 | B2 * | 4/2006 | Schafer et al. | 528/38 |
| 2001/0037008 | A1 * | 11/2001 | Sherman et al. | 528/28 |

FOREIGN PATENT DOCUMENTS

| | | |
|---|---|---|
| EP | 0250248 A2 | 12/1987 |
| EP | 1412416 B1 | 4/2004 |

OTHER PUBLICATIONS

I. Yilgör, A. K. Sha'Aban, W. P. Steckle, Jr., D. Tyagi, G. L. Wilkes and J. E. McGrath, "Segmented organosiloxane copolymers, Synthesis of siloxane-urea copolymers"; Polymer, 1984, vol. 25, pp. 1800-1816, Butterworth & Co.

* cited by examiner

*Primary Examiner* — Margaret Moore
(74) *Attorney, Agent, or Firm* — Brooks Kushman P.C.

(57) ABSTRACT

Polyurea/urethane silicone elastomers with improved properties are obtained by addition of solid polyurea/urethane silicone low molecular weight oligomers.

13 Claims, No Drawings

COMPOSITIONS COMPRISING SILOXANE COPOLYMERS

CROSS-REFERENCE TO RELATED APPLICATIONS

This application is the U.S. national phase of PCT Appln. NO. PCT/EP2010/067519 filed Nov. 16, 2010, which claims priority to German Patent Application No. DE 10 2009 046 850.1 filed Nov. 18, 2009, which are incorporated herein by reference.

BACKGROUND OF THE INVENTION

1. Field of the Invention

The invention relates to compositions comprising siloxane copolymers and property-improving additive components, to processes for production thereof and to the use thereof.

2. Description of the Related Art

The properties of polyurethanes and silicone elastomers are complementary over large areas. Polyurethanes are notable for their excellent mechanical strength, elasticity and very good adhesion, abrasion resistance and simple processing by extrusion from the melt. Silicone elastomers, in contrast, have excellent temperature, UV and weathering stability. At the same time, they retain their elastic properties at relatively low temperatures and therefore do not tend to embrittlement either. In addition, they possess specific water-repellent and adhesive surface properties.

Through the combination of urethane and silicone polymers, materials with good mechanical properties are obtainable, and these at the same time feature significant simplification of processing options compared to the silicones, but still have most of the positive properties of the silicones. The combination of the advantages of the two systems can therefore lead to compounds with low glass transition temperatures, low surface energies, improved thermal and photochemical stabilities, low water absorption and physiologically inert materials.

Through production of polymer blends, it was possible to achieve sufficient compatibilities only in few specific cases. It was not until the preparation, described in I. Yilgör, Polymer, 1984 (25), 1800 and in EP-A-250248, of polydiorganosiloxane-urea and polydiorganosiloxane-urethane block copolymers that the necessary properties were implemented. This involves using, as starting materials for the siloxane-urea and siloxane-urethane copolymers, aminoalkyl- or hydroxyalkyl-terminated polysiloxanes as siloxane units. These form the soft segments in the copolymers, analogously to the polyethers in purely organic polyurethane systems. The hard segments used are standard diisocyanates, and these can also be modified by addition of diamines or diols, for example 1,6-diaminohexane or 1,4-butanediol, to achieve higher strengths. The reaction of the amino compounds with isocyanates proceeds spontaneously and generally does not require any catalyst; in the case of use of hydroxyalkyl units, the use of tin-based addition catalysts, for example, is additionally necessary, as typically used in polyurethane chemistry.

The silicone and isocyanate polymer units are miscible without any problem over a wide range. As a result of the strong interactions of the hydrogen bonds between the urea units, these compounds have a defined softening point and thermoplastic materials are obtained. The use of these thermoplastic materials is conceivable in many applications.

In spite of the good properties of the polydiorganosiloxane-urea or polydiorganosiloxane-urethane block copolymers known to date, there is still a need for materials which are additionally characterized by an improved profile of mechanical properties, such as increased elongation at break or breaking strength.

The invention provides compositions comprising
(A) copolymers of the general formula (1)

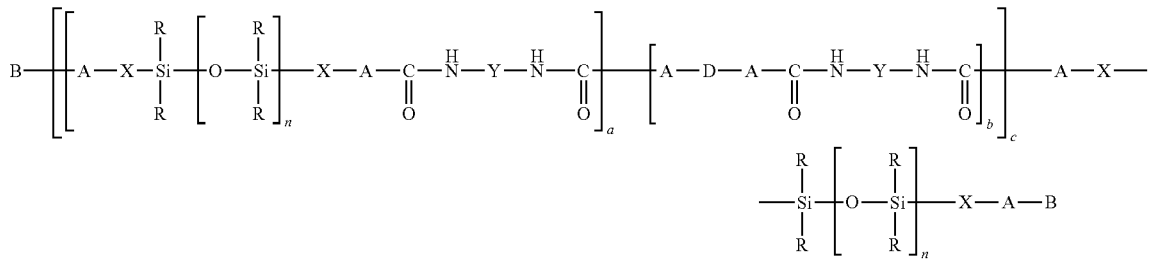

and
(B) a compound of the general formula (2)

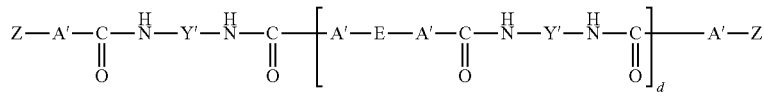

in which

R may be the same or different and is a hydrogen atom or a monovalent SiC-bonded, optionally substituted hydrocarbyl radical, Y may be the same or different and represents divalent, optionally substituted hydrocarbyl radicals, X may be the same or different and represents divalent SiC-bonded, optionally substituted hydrocarbyl radicals which may be interrupted by oxygen atoms, A may be the same or different and is an oxygen atom, sulfur atom or amino group $-NR^1-$, $R^1$ may be the same or different and is a hydrogen atom or an optionally substituted hydrocarbyl radical, D may be the same or different and represents an alkylene radical which is optionally substituted by a halogen atom, $C_1$-$C_6$-alkyl or $C_1$-$C_6$-alkyl ester and has 1 to 700 carbon atoms, in which mutually nonadjacent methylene units may be replaced by —O—, —COO—, —OCO— or —OCOO— groups, B may be the same or different and represents a hydrogen atom, an OCN—Y—NH—CO— radical, an H$_2$N—Y—NH—CO— radical, an R$^2$-A-CO—NH—Y—NH—CO— radical or an R$_3$Si—(O—SiR$_2$)$_n$—X-A-CO—NH—Y—NH—CO— radical, R$^2$ may be the same or different and is a monovalent, optionally silyl-substituted hydrocarbyl radical, A' may be the same or different and has a definition given for A, Z may be the same or different and represents a monovalent, optionally substituted hydrocarbyl radical or a monovalent organosilicon radical, Y' may be the same or different and has a definition given for Y, E may be the same or different and represents a divalent, optionally substituted hydrocarbyl radical, n is an integer from 1 to 4000, a is an integer of at least 1, b is an integer from 0 to 40, c is an integer of at least 1 and d is an integer from 0 to 5, with the proviso that, in compound of the formula (1), the a molecule blocks and b molecule blocks may be randomly distributed in the polymer.

Preferably, the R radical comprises monovalent hydrocarbyl radicals optionally substituted by halogen atoms, such as fluorine or chlorine, amino groups, epoxy groups, carboxyl groups or amide groups, and having 1 to 20 carbon atoms, more preferably monovalent hydrocarbyl radicals having 1 to 6 carbon atoms, especially methyl, ethyl, vinyl and phenyl radicals.

Examples of hydrocarbyl radicals R are alkyl radicals such as the methyl, ethyl, n-propyl, isopropyl, n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical; alkenyl radicals such as the vinyl and allyl radicals; cycloalkyl radicals such as cyclopentyl, cyclohexyl, cycloheptyl and methylcyclohexyl radicals; aryl radicals such as the phenyl and naphthyl radicals; alkaryl radicals such as o-, m-, p-tolyl radicals, xylyl radicals and ethylphenyl radicals; and aralkyl radicals such as the benzyl radical and the α- and β-phenylethyl radicals.

Examples of substituted hydrocarbyl radicals R are aminoalkyl radicals such as the 3-aminopropyl, 2-aminoethyl-3-aminopropyl, and phenylaminomethyl radicals, epoxy radicals such as the 3-glycidoxypropyl radical, and carboxyl ester radicals such as the 3-acryloyloxypropyl, the 3-methacryloyloxypropyl, the acryloyloxymethyl and the methacryloyloxymethyl radicals.

Examples of divalent hydrocarbyl radicals Y are alkylene radicals such as the methylene, ethylene, n-propylene, isopropylene, n-butylene, isobutylene, tert-butylene, n-pentylene, isopentylene, neopentylene, and tert-pentylene radicals, hexylene radicals such as the n-hexylene radical, heptylene radicals such as the n-heptylene radical, octylene radicals such as the n-octylene radical and isooctylene radicals such as the 2,2,4-trimethylpentylene radical, nonylene radicals such as the n-nonylene radical, decylene radicals such as the n-decylene radical, dodecylene radicals such as the n-dodecylene radical; cycloalkylene radicals such as cyclopentylene, cyclo-hexylene, and cycloheptylene radicals, and methylcyclohexylene radicals such as the methylenebis(4-cyclohexylene) and the 3-methylene-3,5,5-trimethylcyclohexylene radicals; arylene radicals such as the phenylene and naphthylene radicals; alkarylene radicals such as o-, m-, p-tolylene radicals, xylylene radicals such as the m-tetramethylxylylene radical, and ethylphenylene radicals; aralkylene radicals such as the benzylene radical, the α- and β-phenylethylene radicals, and the methylenebis(4-phenylene) radical.

The Y radical preferably comprises hydrocarbyl radicals optionally substituted by halogen atoms, such as fluorine or chlorine, and having 3 to 13 carbon atoms, more preferably hydrocarbyl radicals having 3 to 13 carbon atoms, especially the 1,6-hexamethylene radical, the 1,4-cyclohexylene radical, the methylenebis(4-cyclohexylene) radical, the 3-methylene-3,5,5-trimethylcyclohexylene radical, the phenylene radical, the naphthylene radical, the m-tetramethylxylylene radical and the methylenebis(4-phenylene) radical.

Examples of X radicals are the examples given for the Y radical and optionally substituted alkylene radicals in which the carbon chain may be interrupted by oxygen atoms, for example the 2-oxabutylene radical. The X radical preferably comprises alkylene radicals which have 1 to 20 carbon atoms and may be interrupted by oxygen atoms, more preferably alkylene radicals which have 1 to 10 carbon atoms and may be interrupted by oxygen atoms, and most preferably the n-propylene, isobutylene, 2-oxabutylene and methylene radicals.

Preferably, A is an oxygen atom or an NR$^1$ group where R$^1$ is as defined above; more preferably, A is an oxygen atom or an NH group, especially an NH group.

Examples of R$^1$ radicals are the examples given above for R. Preferably, the R$^1$ radicals are hydrogen or alkyl radicals having 1 to 6 carbon atoms, more preferably hydrogen.

Examples of the D radical are the butylene, ethylene, 2-methylpentylene and hexylene radicals, and also —(CH$_2$)$_3$—(O—CH—(CH$_3$)—CH$_2$)$_{2-300}$—O—(CH$_2$)$_3$—, —CH(CH$_3$)—CH$_2$—(O—CH(CH$_3$)—CH$_2$)$_{2-300}$—, —(CH$_2$)$_3$—(O—CH$_2$—CH$_2$)$_{2-300}$—O—(CH$_2$)$_3$— and —CH$_2$—CH$_2$—(OCH$_2$—CH$_2$)$_{2-300}$—.

The D radical preferably comprises divalent polyether radicals and alkylene radicals, more preferably divalent polypropylene glycol radicals and alkylene radicals having at least 2 and at most 20 carbon atoms, such as the ethylene, 2-methylpentylene and butylene radicals; more particularly, they are polypropylene glycol radicals having 2 to 600 carbon atoms and the ethylene and 2-methylpentylene radical.

Examples of hydrocarbyl radicals R$^2$ are the examples given for R radicals.

Examples of silyl-substituted hydrocarbyl radicals R$^2$ are alkoxysilylpropyl radicals such as the 3-trimethoxysilylpropyl, the 3-triethoxysilylpropyl, or the 3-triisopropoxysilylpropyl radicals, alkoxysilylmethyl radicals such as the trimethoxysilylmethyl, the triethoxysilylmethyl or the triisopropoxysilylmethyl radicals, and trialkoxysilylisobutyl radicals such as the 3-trimethoxysilylisobutyl, the 3-triethoxysilylisobutyl and the 3-triisopropoxysilylisobutyl radicals.

Preferably, the R$^2$ radical comprises monovalent hydrocarbyl radicals optionally substituted by alkoxysilyl groups and having 1 to 20 carbon atoms, more preferably monovalent hydrocarbyl radicals having to 6 carbon atoms, and the 3-triethoxysilylpropyl, the 3-trimethoxysilylpropyl, the trimethoxysilylmethyl and the triethoxysilylmethyl radicals.

B is preferably a hydrogen atom, a OCN—Y—NH—CO— radical where Y is n-hexylene, 3-methylene-3,5,5-trimethylcyclohexylene, m-tetramethylxylylene, methylenebis(4-cyclohexylene), methylenebis(4-phenylene), or o-, m- and p-tolylene radical, nBu-NH—CO—NH-n-(CH$_2$)$_6$—NH—CO—,
nBu-NH—CO—NH-(3-methylene-3,5,5-trimethylcyclohexylene)-NH—CO—,
nBu-NH—CO—NH-m-tetramethylxylylene-NH—CO—,
nBu-NH—CO—NH-methylenebis(4-cyclohexylene)-NH—CO—,
nBu-NH—CO—NH-methylenebis(4-phenylene)-NH—CO— or
nBu-NH—CO—NH-tolylene-NH—CO—,
(EtO)$_3$Si—(CH$_2$)$_3$—NH—CO—NH-n-(CH$_2$)$_6$—NH—CO—,
(EtO)$_3$Si—(CH$_2$)$_3$—NH—CO—NH-(3-methylene-3,5,5-trimethylcyclohexylene)-NH—CO—,
(EtO)$_3$Si—(CH$_2$)$_3$—NH—CO—NH-m-tetramethylxylylene-NH—CO—,
(EtO)$_3$Si—(CH$_2$)$_3$—NH—CO—NH-methylenebis(4-cyclohexylene)-NH—CO—,
(EtO)$_3$Si—(CH$_2$)$_3$—NH—CO—NH-methylenebis(4-phenylene)-NH—CO—,
(EtO)$_3$Si—(CH$_2$)$_3$—NH—CO—NH-tolylene-NH—CO—,
(MeO)$_3$Si—(CH$_2$)$_3$—NH—CO—NH-n-(CH$_2$)$_6$—NH—CO—,
(MeO)$_3$Si—(CH$_2$)$_3$—NH—CO—NH-(3-methylene-3,5,5-trimethylcyclohexylene)-NH—CO—,
(MeO)$_3$Si—(CH$_2$)$_3$—NH—CO—NH-m-tetramethylxylylene-NH—CO—,
(MeO)$_3$Si—(CH$_2$)$_3$—NH—CO—NH-methylenebis(4-cyclohexylene)-NH—CO,
(MeO)$_3$Si—(CH$_2$)$_3$—NH—CO—NH-methylenebis(4-phenylene)-NH—CO,
(MeO)$_3$Si—(CH$_2$)$_3$—NH—CO—NH-tolylene-NH—CO—,
(EtO)$_3$Si—CH$_2$—NH—CO—NH-n-(CH$_2$)$_6$—NH—CO—,
(EtO)$_3$Si—CH$_2$—NH—CO—NH-(3-methylene-3,5,5-trimethylcyclohexylene)-NH—CO—,
(EtO)$_3$Si—CH$_2$—NH—CO—NH-m-tetramethylxylylene-NH—CO—,
(EtO)$_3$Si—CH$_2$—NH—CO—NH-methylenebis(4-cyclohexylene)-NH—CO,
(EtO)$_3$Si—CH$_2$—NH—CO—NH-methylenebis(4-phenylene)-NH—CO—,
(EtO)$_3$Si—CH$_2$—NH—CO—NH-tolylene-NH—CO—,
(MeO)$_3$Si—CH$_2$—NH—CO—NH-n-(CH$_2$)$_6$—NH—CO—,
(MeO)$_3$Si—CH$_2$—NH—CO—NH-(3-methylene-3,5,5-trimethylcyclohexylene)-NH—CO—,
(MeO)$_3$Si—CH$_2$—NH—CO—NH-m-tetramethylxylylene-NH—CO—,
(MeO)$_3$Si—CH$_2$—NH—CO—NH-Methylenebis(4-cyclohexylene)-NH—CO,
(MeO)$_3$Si—CH$_2$—NH—CO—NH-methylenebis(4-phenylene)-NH—CO—,
(MeO)$_3$Si—CH$_2$—NH—CO—NH-tolylene-NH—CO—,
Me$_3$Si—(O—SiR$_2$)$_{3-50}$—(CH$_2$)$_3$—NH—CO—NH-n-(CH$_2$)$_6$—NH—CO—,
Me$_3$Si—(O—SiR$_2$)$_{3-50}$—(CH$_2$)$_3$—NH—CO—NH-(3-methylene-3,5,5-trimethylcyclohexylene)-NH—CO—,
Me$_3$Si—(O—SiR$_2$)$_{3-50}$—(CH$_2$)$_3$—NH—CO—NH-m-tetramethylxylylene-NH—CO—,
Me$_3$Si—(O—SiR$_2$)$_{3-50}$—(CH$_2$)$_3$—NH—CO—NH-methylenebis(4-cyclohexylene)-NH—CO—,
Me$_3$Si—(O—SiR$_2$)$_{3-50}$—(CH$_2$)$_3$—NH—CO—NH-methylenebis(4-phenylene)-NH—CO— and
Me$_3$Si—(O—SiR$_2$)$_{3-50}$—(CH$_2$)$_3$—NH—CO—NH-tolylene-NH—CO— radical,
more preferably hydrogen atom, OCN-m-tetramethyl-xylylene-NH—CO—, OCN-methylenebis(4-cyclohexylene), nBu-NH—CO—NH-m-tetramethylxylylene-NH—CO—, nBu-NH—CO—NH-methylenebis(4-cyclohexylene)-NH—CO—, (EtO)$_3$Si—(CH$_2$)$_3$—NH—CO—NH-m-tetramethylxylylene-NH—CO—, (EtO)$_3$Si—(CH$_2$)$_3$—NH—CO—NH-methylenebis(4-cyclohexylene)-NH—CO—, (MeO)$_3$Si—(CH$_2$)$_3$—NH—CO—NH-m-tetramethylxylylene-NH—CO—, (MeO)$_3$Si—(CH$_2$)$_3$—NH—CO—NH-methylenebis(4-cyclohexylene)-NH—CO—, Me$_3$Si—(O—SiR$_2$)$_{3-50}$—(CH$_2$)$_3$—NH—CO—NH-m-tetramethylxylylene-NH—CO— and Me$_3$Si—(O—SiR$_2$)$_{3-50}$—(CH$_2$)$_3$—NH—CO—NH-methylenebis(4-cyclohexylene)-NH—CO— radical, where Me is a methyl radical, Et is an ethyl radical and Bu is a butyl radical.

Examples of Z are the radicals specified for R and silyl-substituted alkyl radicals, for example the 3-triethoxysilylpropyl, the 3-trimethoxysilylpropyl, the 3-triisopropoxysilylpropyl, the trimethoxysilylmethyl, the triethoxysilylmethyl radical and the triisopropoxysilylmethyl radicals, and siloxanyl-substituted alkyl radicals such as the Me$_3$Si—(O—SiR$_2$)$_{3-50}$—(CH$_2$)$_3$— radical and the Me$_3$Si—(O—SiR$_2$)$_{3-50}$—CH$_2$— radical, and also alkoxysiloxanyl-substituted alkyl radicals.

Z preferably comprises hydrocarbyl radicals optionally substituted by alkoxysilyl groups and having 1 to 12 carbon atoms, more preferably alkyl radicals having 2 to 12 carbon atoms, especially the ethyl, n-butyl, 2-ethylhexyl and n-dodecyl radicals.

Examples of the E radical are alkylene radicals such as the methylene, ethylene, n-propylene, isopropylene, n-butylene, isobutylene, tert-butylene, n-pentylene, isopentylene, neopentylene, and tert-pentylene radicals, hexylene radicals such as the n-hexylene radical, heptylene radicals such as the n-heptylene radical, octylene radicals such as the n-octylene radical and isooctylene radicals such as the 2,2,4-trimethylpentylene radical, nonylene radicals such as the n-nonylene radical, decylene radicals such as the n-decylene radical, dodecylene radicals such as the n-dodecylene radical; alkenylene radicals such as the vinylene and the allylene radicals; cycloalkylene radicals such as the cyclobutylene, cyclopentylene, cyclohexylene, cycloheptylene and methylcyclohexylene radicals; arylene radicals such as the phenylene and the naphthylene radicals; alkarylene radicals such as o-, m-, p-tolylene radicals, xylylene radicals and ethylphenylene radicals; and aralkylene radicals such as the benzylene radical, and the α- and the β-phenylethylene radical.

The E radical is preferably a divalent hydrocarbyl radical optionally substituted by halogen atoms such as chlorine or fluorine and having 1 to 20 carbon atoms, more preferably an alkylene radical having at least 2 and at most 12 carbon atoms, especially the ethylene, n-propylene, n-butylene and 2-methylpentylene radicals.

Examples and preferred ranges of Y' are the examples and preferred ranges specified for the Y radical.

Examples and preferred ranges of A' are the examples and preferred ranges specified for the A radical.

n is preferably a number of at least 3, especially at least 10, and preferably at most 800, especially at most 400.

a is preferably a number at most 100, more preferably of 10 to 60.

b is preferably a number of at most 10, more preferably of 0 or 1, especially 0.

d is preferably a number of at most 3, more preferably of 0 or 1, especially 0.

c is preferably a number of at most 400, more preferably 1 to 100, especially 1 to 20.

Examples of copolymers (A) of the formula (1) used in accordance with the invention are H—[NH—(CH$_2$)$_3$—SiMe$_2$-(O—SiMe$_2$)$_{33-45}$—(CH$_2$)$_3$—NH—CO—NH-m-tetramethylxylylene-NH—CO—NH—CH$_2$C(CH$_3$)H—(CH$_2$)$_3$—NH—CO—NH—m-tetramethylxylylene-NH—CO]$_{10}$—NH—(CH$_2$)$_3$—SiMe$_2$-(O—SiMe$_2$)$_{33-45}$—(CH$_2$)$_3$—NH$_2$, H—[NH—(CH$_2$)$_3$—SiMe$_2$-(O—SiMe$_2$)$_{33-45}$—(CH$_2$)$_3$—NH—CO—NH-m-tetramethylxylylene-NH—CO]$_{20-30}$—NH—(CH$_2$)$_3$—SiMe$_2$-(O—SiMe$_2$)$_{33-45}$—(CH$_2$)$_3$—NH$_2$, H—[NH—(CH$_2$)$_3$—SiMe$_2$-(O—SiMe$_2$)$_{33-45}$—(CH$_2$)$_3$—NH—CO—NH-methylenebis(4-cyclohexylene)-NH—CO]$_{20-30}$—NH—(CH$_2$)$_3$—SiMe$_2$-(O—SiMe$_2$)$_{33-45}$—(CH$_2$)$_3$—NH$_2$, H—[NH—(CH$_2$)$_3$—SiMe$_2$-(O—SiMe$_2$)$_{33-45}$—(CH$_2$)$_3$—NH—CO—NH-(3-methylene-3,5,5-trimethylcyclohexylene)-NH—CO]$_{20-30}$—NH—(CH$_2$)$_3$—SiMe$_2$-(O—SiMe$_2$)$_{33-45}$—(CH$_2$)$_3$—NH$_2$, H—[NH—(CH$_2$)$_3$—SiMe$_2$-(O—SiMe$_2$)$_{33-45}$—(CH$_2$)$_3$—NH—CO—NH-1,6-n-(CH$_2$)$_6$—NH—CO—NH—CH$_2$C(CH$_3$)H—(CH$_2$)$_3$—NH—CO—NH-1,6-n-(CH$_2$)$_6$—NH—CO]$_{10}$—NH—(CH$_2$)$_3$—SiMe$_2$-(O—SiMe$_2$)$_{33-45}$—(CH$_2$)$_3$—NH$_2$, H—[NH—(CH$_2$)$_3$—SiMe$_2$-(O—SiMe$_2$)$_{33-45}$—(CH$_2$)$_3$—NH—CO—NH-methylenebis(4-cyclohexylene)-NH—CO—NH—CH$_2$C(CH$_3$)H—(CH$_2$)$_3$—NH—CO—NH-methylenebis(4-cyclohexylene)-NH—CO]$_{10}$—NH—(CH$_2$)$_3$—SiMe$_2$-(O—SiMe$_2$)$_{33-45}$—(CH$_2$)$_3$—NH$_2$, H$_4$C$_9$—NH—CO—NH-methylenebis(4-cyclohexylene)-NH—CO—[NH—(CH$_2$)$_3$—SiMe$_2$-(O—SiMe$_2$)$_{33-45}$—(CH$_2$)$_3$—NH—CO—NH-methylenebis(4-cyclohexylene)-NH—CO]$_{10}$—NH—(CH$_2$)$_3$—SiMe$_2$-(O—SiMe$_2$)$_{33-45}$—(CH$_2$)$_3$—NH—CO—NH-methylenebis(4-cyclohexylene)-NH—CO—NH—C$_4$H$_9$, H$_4$C$_9$—NH—CO—NH-(3-methylene-3,5,5-trimethylcyclohexylene)-NH—CO—[NH—(CH$_2$)$_3$—SiMe$_2$-(O—SiMe$_2$)$_{33-45}$—(CH$_2$)$_3$—NH—CO—NH-(3-methylene-3,5,5-trimethylcyclohexylene)-NH—CO—NH—(CH$_2$)$_3$—SiMe$_2$-(O—SiMe$_2$)$_{33-45}$—(CH$_2$)$_3$—NH—CO—NH-(3-methylene-3,5,5-trimethylcyclohexylene)-NH—CO—NH—C$_4$H$_9$, H$_4$C$_9$—NH—CO—NH-m-tetramethylxylylene-NH—CO—[NH—(CH$_2$)$_3$—SiMe$_2$-(O—SiMe$_2$)$_{33-45}$—(CH$_2$)$_3$—NH—CO—NH-m-tetramethylxylylene-NH—CO]$_{10}$—NH—(CH$_2$)$_3$—SiMe$_2$-(O—SiMe$_2$)$_{33-45}$—(CH$_2$)$_3$—NH—CO—NH-m-tetramethylxylylene-NH—CO—NH—C$_4$H$_9$, Me$_3$Si—(O—SiMe$_2$)$_{15}$—(CH$_2$)$_3$—NH—CO—NH-methylenebis(4-cyclohexylene)-NH—CO—[NH—(CH$_2$)$_3$—SiMe$_2$-(O—SiMe$_2$)$_{33-45}$(CH$_2$)$_3$—NH—CO—NH-methylenebis(4-cyclohexylene)-NH—CO]$_{10}$—NH—(CH$_2$)$_3$—SiMe$_2$-(O—SiMe$_2$)$_{33-45}$—(CH$_2$)$_3$—NH—CO—NH-methylenebis(4-cyclohexylene)-NH—CO—NH—(CH$_2$)$_3$—(SiMe$_2$-O)$_{15}$—SiMe$_3$, Me$_3$Si—(O—SiMe$_2$)$_{15}$—(CH$_2$)$_3$—NH—CO—NH-(3-methylene-3,5,5-trimethylcyclohexylene)-NH—CO—[NH—(CH$_2$)$_3$—SiMe$_2$-(O—SiMe$_2$)$_{33-45}$—(CH$_2$)$_3$—NH—CO—NH-(3-methylene-3,5,5-trimethylcyclohexylene)-NH—CO]$_{10}$—NH—(CH$_2$)$_3$—SiMe$_2$-(O—SiMe$_2$)$_{33-45}$—(CH$_2$)$_3$—NH—CO—NH-(3-methylene-3,5,5-trimethylcyclohexylene)-NH—CO—NH—(CH$_2$)$_3$—(SiMe$_2$-O)$_{15}$—SiMe$_3$, Me$_3$Si—(O—SiMe$_2$)$_{15}$—(CH$_2$)$_3$—NH—CO—NH-m-tetramethylxylylene-NH—CO—[NH—(CH$_2$)$_3$—SiMe$_2$-(O—SiMe$_2$)$_{33-45}$—(CH$_2$)$_3$—NH—CO—NH-m-tetramethylxylylene-NH—CO]$_{10}$—NH—(CH$_2$)$_3$—SiMe$_2$-(O—SiMe$_2$)$_{33-45}$—(CH$_2$)$_3$—NH—CO—NH-m-tetramethylxylylene-NH—CONH—(CH$_2$)$_3$—(SiMe$_2$-O)$_{15}$—SiMe$_3$, (EtO)$_3$Si—(CH$_2$)$_3$—NH—CO—NH-methylenebis(4-cyclohexylene)-NH—CO—[NH—(CH$_2$)$_3$—SiMe$_2$-(O—SiMe$_2$)$_{33-45}$(CH$_2$)$_3$—NH—CO—NH-methylenebis(4-cyclohexylene)-NH—CO]$_{10}$—NH—(CH$_2$)$_3$—SiMe$_2$-(O—SiMe$_2$)$_{33-45}$(CH$_2$)$_3$—NH—CO—NH-methylenebis(4-cyclohexylene)-NH—CO—NH—(CH$_2$)$_3$—Si(OEt)$_3$, (EtO)$_3$Si—(CH$_2$)$_3$—NH—CO—NH-(3-methylene-3,5,5-trimethylcyclohexylene)-NH—CO—[NH—(CH$_2$)$_3$—SiMe$_2$-(O—SiMe$_2$)$_{33-45}$—(CH$_2$)$_3$—NH—CO—NH-(3-methylene-3,5,5-trimethylcyclohexylene)-NH—CO]$_{10}$—NH—(CH$_2$)$_3$—SiMe$_2$-(O—SiMe$_2$)$_{33-45}$—(CH$_2$)$_3$—NH—CO—NH-(3-methylene-3,5,5-trimethylcyclohexylene)-NH—CO—NH—(CH$_2$)$_3$—Si(OEt)$_3$, and (EtO)$_3$Si—(CH$_2$)$_3$—NH—CO—NH-m-tetramethylxylylene-NH—CO—[NH—(CH$_2$)$_3$—SiMe$_2$-(O—SiMe$_2$)$_{33-45}$(CH$_2$)$_3$—NH—CO—NH-m-tetramethylxylylene-NH—CO]$_{10}$—NH—(CH$_2$)$_3$—SiMe$_2$-(O—SiMe$_2$)$_{33-45}$—(CH$_2$)$_3$—NH—CO—NH-m-tetramethylxylylene-NH—CO—NH—(CH$_2$)$_3$—Si(OEt)$_3$, where Me is a methyl radical and Et is an ethyl radical.

Preferably, component (A) used in accordance with the invention is

H$_4$C$_9$—NH—CO—NH-(3-methylene-3,5,5-trimethylcyclohexylene)-NH—CO—[NH—(CH$_2$)$_3$—SiMe$_2$-(O—SiMe$_2$)$_{33-45}$—(CH$_2$)$_3$—NH—CO—NH-(3-methylene-3,5,5-trimethylcyclohexylene)-NH—CO—NH—(CH$_2$)$_3$—SiMe$_2$-(O—SiMe$_2$)$_{33-45}$—(CH$_2$)$_3$—NH—CO—NH-(3-methylene-3,5,5-trimethylcyclohexylene)-NH—CO—NH—C$_4$H$_9$, H—[NH—(CH$_2$)$_3$—SiMe$_2$-(O—SiMe$_2$)$_{33-45}$—(CH$_2$)$_3$—NH—CO—NH-methylenebis(4-cyclohexylene)-NH—CO]$_{20-30}$—NH—(CH$_2$)$_3$—SiMe$_2$-(O—SiMe$_2$)$_{33-45}$—(CH$_2$)$_3$—NH$_2$, H$_4$C$_9$—NH—CO—NH-methylenebis(4-cyclohexylene)-NH—CO—[NH—(CH$_2$)$_3$—SiMe$_2$-(O—SiMe$_2$)$_{33-45}$—(CH$_2$)$_3$—NH—CO—NH-methylenebis(4-cyclohexylene)-NH—CO]$_{10}$—NH—(CH$_2$)$_3$—SiMe$_2$-(O—SiMe$_2$)$_{33-45}$—(CH$_2$)$_3$—NH—CO—NH-methylenebis(4-cyclohexylene)-NH—CO—NH—C$_4$H$_9$ and H—[NH—(CH$_2$)$_3$—SiMe$_2$-(O—SiMe$_2$)$_{33-45}$—(CH$_2$)$_3$—NH—CO—NH-m-tetramethylxylylene-NH—CO]$_{20-30}$—NH—(CH$_2$)$_3$—SiMe$_2$-(O—SiMe$_2$)$_{33-45}$—(CH$_2$)$_3$—NH$_2$, more preferably H$_4$C$_9$—NH—CO—NH-(3-methylene-3,5,5-trimethylcyclohexylene)-NH—CO—[NH—(CH$_2$)$_3$—SiMe$_2$-(O—SiMe$_2$)$_{33-45}$—(CH$_2$)$_3$—NH—CO—NH-(3-methylene-3,5,5-trimethylcyclohexylene)-NH—CO—NH—(CH$_2$)$_3$—SiMe$_2$-(O—SiMe$_2$)$_{33-45}$—(CH$_2$)$_3$—NH—CO—NH-(3-methylene-3,5,5-trimethylcyclohexylene)-NH—CO—NH—C$_4$H$_9$, H$_4$C$_9$—NH—CO—NH-methylenebis(4-cyclohexylene)-NH—CO—[NH—(CH$_2$)$_3$—SiMe$_2$-(O—SiMe$_2$)$_{33-45}$—(CH$_2$)$_3$—NH—CO—NH-methylenebis(4-cyclohexylene)-NH—CO]$_{10}$—NH—(CH$_2$)$_3$—SiMe$_2$-(O—SiMe$_2$)$_{33-45}$—(CH$_2$)$_3$—NH—CO—NH-methylenebis(4-cyclohexylene)-NH—CO—NH—C$_4$H$_9$ and H—[NH—(CH$_2$)$_3$—SiMe$_2$-(O—SiMe$_2$)$_{33-45}$—(CH$_2$)$_3$—NH—CO—NH-m-tetramethylxylylene-NH—CO]$_{20-30}$—NH—(CH$_2$)$_3$—SiMe$_2$-(O—SiMe$_2$)$_{33-45}$—(CH$_2$)$_3$—NH$_2$, where Me is a methyl radical and Et is an ethyl radical.

The copolymers of the formula (1) used in accordance with the invention are, at room temperature and the pressure of the surrounding atmosphere, i.e. about 900 to 1100 hPa, preferably elastomeric solid bodies with tensile strengths preferably between preferably about 0.5 and 20 MPa and elongations at break preferably between preferably about 50 and 1000%. At a pressure of 900 to 1100 hPa, they soften at temperatures preferably between preferably 60 and 200° C. and in doing so gradually lose their elastomeric properties.

The copolymers of the formula (1) used in accordance with the invention preferably have a molecular weight of 30,000 to 400,000, more preferably 50,000 to 200,000, and especially 60,000 to 140,000, in each case measured by gel permeation chromatography against polystyrene standards.

Component (A) used in accordance with the invention comprises commercial products or can be produced analogously to any processes which are already known to the person skilled in the art and are used, for example, for synthesis of (pre)polymers for polyurethanes or thermoplastic silicone elastomers. Reference may be made in this regard, for example, to EP 1 412 416, which is incorporated herein by reference.

Examples of component (B) used in accordance with the invention are
Me—NH—CO—NH-1,6-n-$(CH_2)_6$—NH—CO—NH-Me,
Me—NH—CO—NH-m-tetramethylxylylene-NH—CO—NH-Me,
Me—NH—CO—NH-(3-methylene-3,5,5-trimethylcyclohexylene)-NH—CO—NH-Me,
Me—NH—CO—NH-methylenebis(4-cyclohexylene)-NH—CO—NH-Me,
Me—NH—CO—NH-methylenebis(4-phenylene)-NH—CO—NH-Me,
Bu—NH—CO—NH-1,6-n-$(CH_2)_6$—NH—CO—NH-Bu,
Bu—NH—CO—NH-m-tetramethylxylylene-NH—CO—NH-Bu,
Bu—NH—CO—NH-(3-methylene-3,5,5-trimethylcyclohexylene)-NH—CO—NH-Bu,
Bu—NH—CO—NH-methylenebis(4-cyclohexylene)-NH—CO—NH-Bu,
Bu—NH—CO—NH-methylenebis(4-phenylene)-NH—CO—NH-Bu,
Et-O—CO—NH-1,6-n-$(CH_2)_6$—NH—CO—OEt,
Et-O—CO—NH-m-tetramethylxylylene-NH—CO—O-Et,
Et-O—CO—NH-(3-methylene-3,5,5-trimethylcyclohexylene)-NH—CO—O-Et,
Et-O—CO—NH-methylenebis(4-cyclohexylene)-NH—CO—O-Et,
Et-O—CO—NH-methylenebis(4-phenylene)-NH—CO—O-Et,
$H_3C$—$(CH_2)_3$—$CH(C_2H_5)$—$CH_2$—NH—CO—NH-1,6-n-$(CH_2)_6$—NH—CO—NH—$CH_2$—$CH(C_2H_5)$—$(CH_2)_3$—$CH_3$,
$H_3C$—$(CH_2)_3$—$CH(C_2H_5)$—$CH_2$—NH—CO—NH-m-tetramethylxylylene-NH—CO—N—$CH_2$—$CH(C_2H_5)$—$(CH_2)_3$—$CH_3$,
$H_3C$—$(CH_2)_3$—$CH(C_2H_5)$—$CH_2$—NH—CO—NH-(3-methylene-3,5,5-trimethylcyclohexylene)-NH—CO—NH—$CH_2$—$CH(C_2H_5)$—$(CH_2)_3$—$CH_3$,
$H_3C$—$(CH_2)_3$—$CH(C_2H_5)$—$CH_2$—NH—CO—NH-methylenebis(4-cyclohexylene)-NH—CO—NH—$CH_2$—$CH(C_2H_5)$—$(CH_2)_3$—$CH_3$,
$H_3C$—$(CH_2)_3$—$CH(C_2H_5)$—$CH_2$—NH—CO—NH-methylenebis(4-phenylene)-NH—CO—NH—$CH_2$—$CH(C_2H_5)$—$(CH_2)_3$—$CH_3$,
$(EtO)_3Si$—$(CH_2)_3$—NH—CO—NH-1,6-n-$(CH_2)_6$—NH—CO—NH—$(CH_2)_3$—$Si(OEt)_3$,
$(EtO)_3Si$—$(CH_2)_3$—NH—CO—NH-m-tetramethylxylylene-NH—CO—NH—$(CH_2)_3$—$Si(OEt)_3$,
$(EtO)_3Si$—$(CH_2)_3$—NH—CO—NH-(3-methylene-3,5,5-trimethylcyclohexylene)-NH—CO—NH—$(CH_2)_3$—$Si(OEt)_3$,
$(EtO)_3Si$—$(CH_2)_3$—NH—CO—NH-methylenebis(4-cyclohexylene)-NH—CO—NH—$(CH_2)_3$—$Si(OEt)_3$,
$(EtO)_3Si$—$(CH_2)_3$—NH—CO—NH-methylenebis(4-phenylene)-NH—CO—NH—$(CH_2)_3$—$Si(OEt)_3$,
$(EtO)_3Si$—$CH_2$—N(cy-hex)-CO—NH-1,6-n-$(CH_2)_6$—NH—CO—N(cy-hex)-$CH_2$—$Si(OEt)_3$,
$(EtO)_3Si$—$CH_2$—N(cy-hex)-CO—NH-m-tetramethylxylylene-NH—CO—N(cy-hex)-$CH_2$—$Si(OEt)_3$,
$(EtO)_3Si$—$CH_2$—N(cy-hex)-CO—NH-(3-methylene-3,5,5-trimethylcyclohexylene)-NH—CO—N(cy-hex)-$CH_2$—$Si(OEt)_3$,
$(EtO)_3Si$—$CH_2$—N(cy-hex)-CO—NH-methylenebis(4-cyclohexylene)-NH—CO—N(cy-hex)-$CH_2$—$Si(OEt)_3$,
$(EtO)_3Si$—$CH_2$—N (cy-hex)-CO—NH-methylenebis(4-phenylene)-NH—CO—N(cy-hex)-$CH_2$—$Si(OEt)_3$,
$Me_3Si$—$(O$—$SiMe_2)_{15}$—$(CH_2)_3$—NH—CO—NH-1,6-n-$(CH_2)_6$—NH—CO—NH—$(CH_2)_3$—$(SiMe_2$-$O)_{15}$—$SiMe_3$,
$Me_3Si$—$(O$—$SiMe_2)_{15}$—$(CH_2)_3$—NH—CO—NH-m-tetramethylxylylene-NH—CO—NH—$(CH_2)_3$—$(SiMe_2$-$O)_{15}$—$SiMe_3$,
$Me_3Si$—$(O$—$SiMe_2)_{15}$—$(CH_2)_3$—NH—CO—NH-(3-methylene-3,5,5-trimethylcyclohexylene)-NH—CO—NH—$(CH_2)_3$—$(SiMe_2$-$O)_{15}$—$SiMe_3$,
$Me_3Si$—$(O$—$SiMe_2)_{15}$—$(CH_2)_3$—NH—CO—NH-methylenebis(4-cyclohexylene)-NH—CO—NH—$(CH_2)_3$—$(SiMe_2$-$O)_{15}$—$SiMe_3$ and
$Me_3Si$—$(O$—$SiMe_2)_{15}$—$(CH_2)_3$—NH—CO—NH-methylenebis(4-phenylene)-NH—CO—NH—$(CH_2)_3$—$(SiMe_2O)_{15}$—$SiMe_3$, where Me is a methyl radical, Et is an ethyl radical and Bu is a butyl radical.

Component (B) used in accordance with the invention is preferably Me—NH—CO—NH-m-tetramethylxylylene-NH—CO—NH-Me,
Me—NH—CO—NH-(3-methylene-3,5,5-trimethylcyclohexylene)-NH—CO—NH-Me,
Me—NH—CO—NH-methylenebis(4-cyclohexylene)-NH—CO—NH-Me,
Bu—NH—CO—NH-m-tetramethylxylylene-NH—CO—NH-Bu,
Bu—NH—CO—NH-(3-methylene-3,5,5-trimethylcyclohexylene)-NH—CO—NH-Bu,
Bu—NH—CO—NH-methylenebis(4-cyclohexylene)-NH—CO—NH-Bu,
$Me_3Si$—$(O$—$SiMe_2)_{15}$—$(CH_2)_3$—NH—CO—NH-m-tetramethylxylylene-NH—CO—NH—$(CH_2)_3$—$(SiMe_2$-$O)_{15}$—$SiMe_3$,
$Me_3Si$—$(O$—$SiMe_2)_{15}$—$(CH_2)_3$—NH—CO—NH-(3-methylene-3,5,5-trimethylcyclohexylene)-NH—CO—NH—$(CH_2)_3$—$(SiMe_2$-$O)_{15}$—$SiMe_3$,
$Me_3Si$—$(O$—$SiMe_2)_{15}$—$(CH_2)_3$—NH—CO—NH-methylenebis(4-cyclohexylene)-NH—CO—NH—$(CH_2)_3$—$(SiMe_2$-$O)_{15}$—$SiMe_3$,
Et-O—CO—NH-1,3-tetramethylxylylene-NH—CO—O-Et,
Et-O—CO—NH-(3-methylene-3,5,5-trimethylcyclohexylene)-NH—CO—O-Et,
Et-O—CO—NH-methylenebis(4-cyclohexylene)-NH—CO—O-Et,
$(EtO)_3Si$—$(CH_2)_3$—NH—CO—NH-m-tetramethylxylylene-NH—CO—NH—$(CH_2)_3$—$Si(OEt)_3$, (EtO)₃Si—(CH₂)₃—NH—CO—NH-(3-methylene-3,5,5-trimethylcyclohexylene)-NH—CO—NH—(CH₂)₃—Si(OEt)₃ and
(EtO)₃Si—(CH₂)₃—NH—CO—NH-methylenebis(4-cyclohexylene)-NH—CO—NH—(CH₂)₃—Si(OEt)₃,
more preferably
Bu-NH—CO—NH-m-tetramethylxylylene-NH—CO—NH-Bu,
Bu-NH—CO—NH-(3-methylene-3,5,5-trimethylcyclohexylene)-NH—CO—NH-Bu,
Bu-NH—CO—NH-methylenebis(4-cyclohexylene)-NH—CO—NH-Bu,
Et-O—CO—NH-m-tetramethylxylylene-NH—CO—O-Et,
Et-O—CO—NH-(3-methylene-3,5,5-trimethylcyclohexylene)-NH—CO—O-Et,
Et-O—CO—NH-methylenebis(4-cyclohexylene)-NH—CO—O-Et,
(EtO)₃Si—(CH₂)₃—NH—CO—NH-m-tetramethylxylylene-NH—CO—NH—(CH₂)₃—Si(OEt)₃,
(EtO)₃Si—(CH₂)₃—NH—CO—NH-(3-methylene-3,5,5-trimethylcyclohexylene)-NH—CO—NH—(CH₂)₃—Si(OEt)₃ and
(EtO)₃Si—(CH₂)₃—NH—CO—NH-methylenebis(4-cyclohexylene)-NH—CO—NH—(CH₂)₃—Si(OEt)₃,
especially
Bu-NH—CO—NH-m-tetramethylxylylene-NH—CO—NH-Bu,
Bu-NH—CO—NH-(3-methylene-3,5,5-trimethylcyclohexylene)-NH—CO—NH-Bu,
Bu-NH—CO—NH-methylenebis(4-cyclohexylene)-NH—CO—NH-Bu,
Et-O—CO—NH-m-tetramethylxylylene-NH—CO—O-Et,
Et-O—CO—NH-(3-methylene-3,5,5-trimethylcyclohexylene)-NH—CO—O-Et and
Et-O—CO—NH-methylenebis(4-cyclohexylene)-NH—CO—O-Et,
where Me is a methyl radical, Et is an ethyl radical and Bu is a butyl radical.

In a particularly preferred embodiment, in component (B), the A' radicals are the same as the A radical, Y' radicals are the same as the Y radical and E radicals are the same as the D radical of the component (A) used in each case.

Typically, components (B) are colorless to white solids which can barely be melted without decomposition due to limited thermal stability.

The compounds of the formula (2) used in accordance with the invention preferably have a molecular weight of up to 5000, more preferably up to 3000, and especially up to 2000.

Component (B) used in accordance with the invention can be prepared analogously to any chemical processes which are already known to the person skilled in the art and are used, for example, for synthesis of urethanes and ureas.

Preferably, component (B) used in accordance with the invention is prepared by reaction of diisocyanate of the formula (3)

OCN—Y'—NCO with compound of the formula (4)

Z-A'-H and optionally with chain extender of the formula (5)

H-A'-E-A'-H where Y', Z, A' and E each have one of the definitions given above and the reaction is optionally performed in the presence of organic solvent and optionally in the presence of catalysts.

Examples of diisocyanates of the formula (3) which can be used for preparation of component (B) are n-hexamethylene 1,6-diisocyanate, methylenebis(4-isocyanatocyclohexane), m-tetramethylxylylene diisocyanate, diphenylmethane 4,4-diisocyanate, isophorone diisocyanate, cyclohexylene 1,4-diisocyanate, tolylene 2,4-diisocyanate and tolylene 2,6-diisocyanate, preference being given to hexamethylene 1,6-diisocyanate, methylenebis(4-isocyanatocyclohexne), m-tetramethylxylylene diisocyanate, diphenylmethane 4,4-diisocyanate and isophorone diisocyanate, and particular preference to methylenebis(4-isocyanatocyclohexane), m-tetramethylxylylene diisocyanate and isophorone diisocyanate.

Examples of alcohols of the formula (4) which can be used for preparation of component (B) are methanol, ethanol, n-propanol, isopropanol, n-butanol, isobutanol, tert-butanol, hexanol, heptanol and dodecanol, preference being given to methanol, ethanol, isopropanol and n-butanol, and particular preference to methanol, ethanol and isopropanol.

Examples of amines of the formula (4) which can be used for preparation of component (B) are methylamine, propylamine, ethylamine, butylamine, hexylamine, 2-ethylhexylamine and dodecylamine, and aminosilanes such as 3-aminopropyltriethoxysilane, 3-aminopropyltrimethoxysilane, cyclohexylaminomethyltriethoxysilane, cyclohexylaminomethyl(diethoxy)methylsilane, phenylaminomethyltrimethoxysilane and phenylaminomethyl(dimethoxy)methylsilane, preference being given to butylamine, hexylamine, 2-ethylhexylamine, 3-aminopropyltriethoxysilane, 3-aminopropyltrimethoxysilane, cyclohexylaminomethyltriethoxysilane and phenylaminomethyltrimethoxysilane, and particular preference to butylamine, 2-ethylhexylamine and 3-aminopropyltrimethoxysilane.

Examples of chain extenders of the formula (5) which can be used for the preparation of component (B) are diamines, for example 1,2-ethylenediamine, 1,3-propylenediamine, 1,4-n-butylenediamine, 1,5-n-pentylenediamine, 1,6-n-hexylenediamine, 2-methyl-1,5-pentylenediamine, 1,4-phenylenediamine, diols, for example 1,2-ethanediol, 1,4-n-butanediol, 1,6-n-hexanediol, 1,4-cyclohexanediol, or else dithiols, for example 1,4-butanedithiol, preference being given to 1,2-ethylenediamine, 1,4-n-butylenediamine, 2-methyl-1,5-pentylenediamine and 1,4-n-butanediol, and particular preference to 1,2-ethylenediamine, 2-methyl-1,5-pentylenediamine and 1,4-n-butanediol.

In a preferred process variant for preparation of component (B), the appropriate diisocyanate and the amine or alcohol are reacted together with any chain extender desired, optionally in the presence of catalyst, the reaction preferably being performed in an organic, polar aprotic solvent. Preference is given to initially charging the amine or alcohol, optionally together with catalyst and/or chain extender, in the solvent and adding the diisocyanate gradually in order to avoid any side reactions.

The amine or alcohol is preferably used, relative to the diisocyanate, in a molar ratio of 1.8 to 2.2:1, more preferably 1.9 to 2.1:1, yet more preferably 1.95 to 2.05:1 and especially 1.99 to 2.01:1.

When chain extenders are used, additional isocyanate is added in a molar ratio of preferably 0.8 to 1.2:1, more preferably of 0.95 to 1.05:1 and especially of 0.99 to 1.01:1, in each case relative to the chain extender.

The reaction is preferably effected at temperatures between 10 and 150° C., more preferably at 15 to 130° C. and especially at 20 to 120° C., and preferably at the pressure of the surrounding atmosphere, i.e. between 900 and 1100 hPa.

Preferred solvents which can optionally be used for preparation of component (B) are polar aprotic organic liquids, such as halogenated hydrocarbons, for example dichloromethane, chloroform or hexachloroethane, ethers, for example tetrahydrofuran, tert-butyl methyl ether or dioxane, ketones, for example acetone, methyl ethyl ketone or methyl isobutyl ketone, and esters, for example ethyl acetate, or else aromatic solvents, for example toluene or xylene. If solvents are used for preparation of component (B), they are more preferably chloroform, tetrahydrofuran and tert-butyl methyl ether.

Catalysts which can be used to accelerate the reaction of the diisocyanates with the alcohols used are the tertiary amines known to those skilled in the art from polyurethane chemistry, for example N,N-dimethylcyclohexylamine, N,N-dimethylbenzylamine, N, N-dimethylcetylamine and diaminobicycloamine ("DABCO"), or organometallic compounds, for example tin(II) octoate, dibutyltin dilaurate ("DBTL"), dioctyltin dilaurate or dibutyltin oxide, lead octoates, or else bismuth compounds such as bismuth octoate or bismuth neodecanoate (see, for example, "The ICI Polyurethane Handbook, 2nd ed., Wiley, 1990), preference being given to tin compounds and particular preference to dibutyltin dilaurate and dioctyltin dilaurate.

The inventive compositions contain component (B) in amounts of preferably 0.1 to 40 parts by weight, more preferably 0.5 to 20 parts by weight, especially 1 to 15 parts by weight, based in each case on 100 parts by weight of component (A).

In addition to components (A) and (B), the inventive compositions may also comprise further constituents, for example organic solvents (C), UV stabilizers (D), antioxidants (E) and fillers (F).

Examples of optionally used organic solvents (C) are polar aprotic solvents such as ethers, for example tetrahydrofuran, diethyl ether, tert-butyl methyl ether or dioxane, ketones, for example acetone, methyl ethyl ketone or methyl isobutyl ketone, chlorinated hydrocarbons, for example dichloromethane, chloroform, tetrachloroethane, and esters, for example ethyl acetate, and also, if A and A' in the formulae (1) and (2) are each $NR^1$, polar protic organic solvents such as alcohols, for example ethanol, n-propanol, isopropanol, n-butanol or isobutanol. When all or some of A and A' are defined as oxygen atoms or sulfur atoms, the above-described polar protic solvents are preferably not used.

The term "solvent" does not mean that all reaction components must dissolve therein. The reaction can also be conducted in a suspension or emulsion of one or more reaction partners. The reaction can also be executed in a solvent mixture having a miscibility gap, in which case at least one reaction partner is soluble in each of the mixture phases.

Preferably, the solvent (C) optionally used comprises polar aprotic solvents, for example tetrahydrofuran, tert-butyl methyl ether, methyl ethyl ketone, methyl isobutyl ketone and chloroform, especially tetrahydrofuran and chloroform.

If the inventive compositions comprise solvents (C), the amounts are preferably 2 to 10 parts by weight, more preferably 4 to 7 parts by weight, based in each case on 1 part by weight of component (A). The inventive compositions preferably do not contain any solvent (C).

Examples of optionally used UV stabilizers (D) are 4-hydroxybenzoates, benzophenones such as 2-hydroxybenzophenone, benzotriazoles such as 2-hydroxyphenylbenzotriazole, or triazine compounds.

If the inventive compositions comprise UV stabilizers (D), the amounts are preferably 1 to 5000 ppm by weight, more preferably 100 to 2000 ppm by weight, based in each case on the total weight of components (A) and (B).

Examples of the optionally used antioxidants (E) are, for example, sterically hindered phenols such as 2,6-di-tert-butyl-4-methylphenol, 2,2'-methylenebis(4-methyl-6-tert-butylphenol), N,N'-1,6-hexamethylenebis-3-(3,5-di-tert-butyl-4-hydroxyphenyl)propionamide, or sterically hindered amines, for example compounds of the formulae

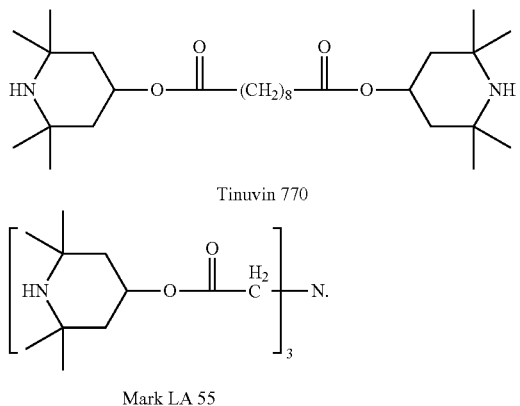

Tinuvin 770

Mark LA 55

If the inventive compositions comprise antioxidants (E), the amounts are preferably 1 to 5000 ppm by weight, more preferably 100 to 2000 ppm by weight, based in each case on the total weight of components (A) and (B).

Examples of optionally used filler (F) are reinforcing fillers, i.e. fillers having a BET surface area of at least 30 m²/g, for example carbon blacks, fumed silica, precipitated silica and silicon-aluminum mixed oxides, where the fillers mentioned may be hydrophobized, and also non-reinforcing fillers, i.e. fillers having a BET surface area of less than 30 m²/g, for example powders of quartz, cristobalite, diatomaceous earth, calcium silicate, zirconium silicate, montmorillonites such as bentonites, zeolites including the molecular sieves, for example sodium aluminum silicate, metal oxides such as aluminum oxide or zinc oxide or mixed oxides thereof, metal hydroxides such as aluminum hydroxide, barium sulfate, calcium carbonate, gypsum, silicon nitride, silicon carbide, boron nitride, glass powder, charcoal powder and polymer powder, and hollow glass and polymer beads.

Filler (F) preferably comprises fumed silicas, particular preference being given to a BET surface area of at least 30 m²/g.

If the inventive compositions comprise filler (F), the amounts are preferably 1 to 1000 parts by weight, more preferably 10 to 500 parts by weight, based in each case on 100 parts by weight of the total weight of component (A) and component (B). The inventive compositions preferably do not comprise any fillers (F).

The components used in accordance with the invention may each be one kind of such a component, or else a mixture of at least two kinds of a respective component.

The inventive compositions preferably do not contain any further components over and above components (A) to (F).

The inventive compositions can be produced in any manner known to date.

The invention further provides a process for producing the inventive compositions, which can be effected (i) in solution, i.e. in the presence of solvent (C), or (ii) in a solvent-free manner, i.e. in the absence of solvent (C).

The organic solvents (C) are used in the solvent-based process variants in amounts of preferably 10 to 5000 parts by weight, more preferably 100 to 2500 parts by weight, especially 250 to 1000 parts by weight, based in each case on 100 parts by weight of the inventive composition.

In process variant (i) of the invention, components (A) and (B) and optionally further components (D) to (F) are mixed thoroughly with organic solvent (C) in any sequence and the desired ratios. Thereafter—if desired—the mixture thus obtained is introduced into a mold and the solvent is removed, for example by evaporation or vaporization, which gives the inventive composition in the desired form, for example as a film.

In process variant (i) of the invention, the mixing is preferably effected at a pressure of 0.1 mbar to 25 bar, more preferably 0.1 to 5 bar, especially at 0.7 to 1.3 bar.

The mixing in process variant (i) is effected preferably within a temperature range of −40 to 180° C., more preferably 0 to 100° C., especially 20 to 60° C.

In process variant (ii) of the invention, components (A), (B) and optionally (D), (E) and (F) are mixed with one another, for which all mixers, kneaders or extruders known to date can be used. Variant (ii) can be performed continuously or batchwise, preferably continuously. Particular preference is given to the continuous solvent-free preparation (ii) of the inventive compositions using extruders having one or two shafts.

In the solvent-free process variant (ii), the mixing is preferably effected at a temperature of 20 to 240° C., more preferably at 40 to 180° C.

The solvent-free preparation (ii) of the inventive compositions is preferred especially when the inventive composition is to be provided in the form of granules or complex moldings, such as profiles or injection moldings.

In the case of the process according to the invention in solution, it is also possible—if desired—to prepare component (B) (variant (ib)) or component (A) (variant (ia)) in situ.

In the case of preparation of the inventive composition in solution, in process variant (ib), component (A) and the optionally used components (D), (E) and (F) are mixed with organic solvent (C). Thereafter, this mixture is mixed with the reactants needed for preparation of component (B), and component (B) is thus prepared in the presence of component (A) and the further components. In this process variant, in a first step, amine or the alcohol of the formula (4), together with the catalyst optionally used for preparation of (B) and optionally chain extender of the formula (5), is preferably first added to the mixture comprising component (A), (C), and optionally components (D), (E) and (F). In a second step, diisocyanate of the formula (3) is then added to the mixture obtained in the first step. After the metered addition of the reactants has ended, stirring is continued for a period of preferably 0.1 to 24 hours, more preferably until completion of reaction. Thereafter—if desired—the mixture thus obtained is introduced into a mold and the solvent is removed, for example by evaporation or vaporization, which gives the inventive composition in the desired form, for example as a film.

Process variant (ib) of the invention is preferably effected at a pressure of 0.1 mbar to 25 bar, more preferably 0.1 to 5 bar, especially at 0.7 to 1.3 bar, Process variant (ib) of the invention is preferably effected within a temperature range of −40 to 180° C., more preferably 0 to 100° C., especially at a temperature of 20 to 70° C.

In the case of preparation of the inventive composition in solution, in a process variant (ia), component (B) and the optionally used components (D), (E) and (F) are mixed with organic solvent (C). Thereafter, this mixture is mixed with the reactants which are used for preparation of component (A) and are of the formulae $$H\text{-}A\text{-}X\text{—}SiR_2\text{—}(O\text{—}SiR_2)_n\text{—}X\text{-}A\text{-}H \quad (6),$$

$$OCN\text{—}Y\text{—}NCO \quad (7),$$

optionally $$H\text{-}A\text{-}D\text{-}A\text{-}H \quad (8)$$

and/or optionally $$R_3Si\text{—}(O\text{—}SiR_2)_n\text{—}X\text{-}A\text{-}H \quad (9)$$

and/or optionally $$R^2\text{-}A\text{-}H \quad (10),$$

where A, X, R, Y, D, $R^2$ and n are each as defined above, and component (A) is thus prepared in the presence of component (B). Preferably, in this process variant, in a first step, the reactants of the formulae 6) and optionally (8), (9) and (10) required for preparation of component (A) are first added to the mixture of components (B) and (C), and optionally (D), (E) and (F). In a second step, diisocyanate of the formula (7) is then added to the mixture obtained in the first step. After metered addition of the reactants has ended, stirring is continued for a period of preferably 0.1 to 24 hours, preferably until completion of reaction. Thereafter—if desired—the mixture thus obtained is introduced into a mold and the solvent is removed, for example by evaporation or vaporization, which gives the inventive composition in the desired form, for example as a film.

Variant (ia) of the invention is preferably performed at a pressure of 0.1 mbar to 25 bar, more preferably from 0.1 to 5 bar, especially at 0.7 to 1.3 bar.

Variant (ia) of the invention is preferably effected within a temperature range from −40 to 180° C., more preferably from 0 to 100° C., especially at 20 to 70° C.

The inventive solvent-based variants (i), (ia) and (ib) for preparation of the inventive compositions are preferably performed with exclusion of moisture and more preferably under protective gas atmosphere, especially dry nitrogen or argon.

The solvent-based variants (i), (ia) and (ib) for preparation of the inventive compositions are especially preferred when the inventive composition is to be provided in the form of films, especially having a thickness of 0.1 μm to 2 mm.

The process according to the invention is preferably process variant (i), more preferably (ib).

The inventive compositions are preferably, at room temperature and the pressure of the surrounding atmosphere, i.e. about 900 to 1100 hPa, elastomeric solid bodies having tensile strengths preferably between about 0.5 and 40 MPa and elongations at break preferably between about 50 and 1000%. They are preferably transparent thermoplastic materials which, at a pressure of 900 to 1100 hPa, soften at temperatures preferably between 60 and 200° C. and in doing so gradually lose their elastomeric properties. The inventive compositions preferably exhibit, in gel permeation chromatograms, a bimodal molecular weight distribution as a result of simultaneous presence of components (A) and (B) alongside one another.

The inventive compositions can be used for the same purposes for which thermoplastic elastomers have also been used to date. The inventive compositions can be used in sealing compounds, adhesives, as a material for fibers, as a polymer additive, for example as an impact modifier or flame retardant, as embedding materials for photovoltaic modules, as a material for antifoam formulations, as a high-performance polymer (thermoplastic, thermoplastic elastomer, elastomer), as a packaging material for electronic components, in insulation or shielding materials, in cable sheathing, in antifouling materials, as an additive for cleansing, cleaning or care compositions, as an additive for personal hygiene compositions, as a coating material for wood, paper and cardboard, as a mold release agent, as a biocompatible material in medical applications such as contact lenses, as a coating material for textile fibers, or for production of textile fabrics from fibers of the thermoplastic material, as a coating material for natural substances, for example leather and pelts, as a material for membranes and as a material for photoactive systems, for example for lithographic processes, optical data security or optical data transfer.

The inventive compositions have the advantage that they are easy to produce and have excellent processability. In addition, the inventive compositions have the advantage of having excellent mechanical properties.

The inventive compositions also have the advantage that already existing products (A) can be mechanically improved in a simple manner according to existing requirements, without needing to develop a new base polymer.

The inventive compositions additionally have the advantage that they have much better mechanical properties than polymers which are prepared in a reaction as described for component (A), in which all reactants for the synthesis of (A) and (B) are used together.

In the examples described hereinafter, all viscosity figures are based on a temperature of 25° C. Unless stated otherwise, the examples which follow are conducted at a pressure of the surrounding atmosphere, i.e. at about 1000 hPa, and at room temperature, i.e. at about 23° C., or at a temperature which is established on combination of the reactants at room temperature without additional heating or cooling, and at a relative air humidity of about 50%. In addition, all figures for parts and percentages, unless stated otherwise, are based on weight.

The Shore A hardness is determined to DIN (Deutsche Industrie Norm) 53505 (August 2000 edition).

Tensile strength, elongation at break and modulus (stress at 100% elongation) were determined to DIN 53504 (May 1994 edition) on specimens of the S2 shape.

Preparation of Component (B)

Compound B1:

In a dry 1 l three-neck flask with stirrer, internal thermometer and reflux condenser with pressure equalizer and dropping funnel, 35.80 g of n-butylamine are mixed with 500 ml of tetrahydrofuran under nitrogen. 64.20 g of methylenebis(4-isocyanatocyclohexane) are added homogeneously to this mixture within 30 minutes. During the addition, the product precipitates out as a white solid. After addition has ended, the mixture is stirred at room temperature for another 30 minutes and then the product is filtered off, washed repeatedly with n-hexane and finally dried under reduced pressure. 95.3 g of the reaction product are obtained as a white solid.

Compound B2:

In a dry 2 l three-neck flask with stirrer, internal thermometer and reflux condenser with pressure equalizer and dropping funnel, 37.45 g of n-butylamine are mixed with 1100 ml of chloroform and 250 ml of tetrahydrofuran under nitrogen. 62.55 g of m-tetramethylxylylene diisocyanate are added homogeneously to this mixture within 30 minutes, in the course of which the reaction of the two components is observed by the strong exothermicity. After addition has ended, the mixture is stirred at room temperature for another 30 minutes and then the solvent is removed on a rotary evaporator under reduced pressure. 98.1 g of the reaction product are obtained as a white solid.

Compound B3:

In a dry 1 l three-neck flask with stirrer, internal thermometer and reflux condenser with pressure equalizer and dropping funnel, 39.69 g of n-butylamine are mixed with 500 ml of chloroform under nitrogen. 60.31 g of isophorone diisocyanate are added homogeneously to this mixture within 30 minutes, in the course of which the reaction of the two components is observed by the strong exothermicity. After addition has ended, the mixture is stirred at room temperature for another 30 minutes and then the solvent is removed on a rotary evaporator under reduced pressure. 98.3 g of the reaction product are obtained as a white solid.

Compound B4:

In a dry 1 l three-neck flask with stirrer, internal thermometer and reflux condenser with pressure equalizer and dropping funnel, 29.30 g of n-butylamine and 100 mg of dibutyltin dilaurate are mixed with 500 ml of tetrahydrofuran under nitrogen. 70.70 g of isophorone diisocyanate are added homogeneously to this mixture within 30 minutes. After addition has ended, the mixture is heated to reflux with stirring for another 2 hours and then the solvent is removed on a rotary evaporator under reduced pressure. 97.6 g of the reaction product are obtained as a clear viscous oil. After a few days, the product crystallizes out.

Compound B5:

In a dry 1 l three-neck flask with stirrer, internal thermometer and reflux condenser with pressure equalizer and dropping funnel, 27.39 g of ethanol and 100 mg of dibutyltin dilaurate are mixed with 500 ml of tetrahydrofuran under nitrogen. 72.61 g of m-tetramethylxylylene diisocyanate are added homogeneously to this mixture within 30 minutes. After addition has ended, the mixture is heated to reflux with stirring for another 2 hours and then the solvent is removed on a rotary evaporator under reduced pressure. 98.2 g of the reaction product are obtained as a white solid.

Compound B6:

In a dry 1 l three-neck flask with stirrer, internal thermometer and reflux condenser with pressure equalizer and dropping funnel, 25.99 g of ethanol and 100 mg of dibutyltin dilaurate are mixed with 500 ml of tetrahydrofuran under nitrogen. 74.01 g of methylenebis(4-isocyanatocyclohexane) are added homogeneously to this mixture within 30 minutes. After addition has ended, the mixture is heated to reflux with stirring for another 2 hours and then the solvent is removed on a rotary evaporator under reduced pressure. 99.1 g of the reaction product are obtained as a white solid.

Compound B7:

In a dry 1 l three-neck flask with stirrer, internal thermometer and reflux condenser with pressure equalizer and dropping funnel, 59.60 g of 2-ethylhexylamine are mixed with 500 ml of chloroform under nitrogen. 60.4 g of methylenebis(4-isocyanatocyclohexane) are added homogeneously to this mixture within 30 minutes. After addition has ended, the mixture is stirred at room temperature for another 30 minutes and then the solvent is removed under reduced pressure. The remaining product is washed repeatedly with n-hexane and finally dried under reduced pressure. 116.3 g of the reaction product are obtained as a white solid.

Compound B8:

In a dry 1 l three-neck flask with stirrer, internal thermometer and reflux condenser with pressure equalizer and dropping funnel, 61.6 g of 2-ethylhexylamine are mixed with 500 ml of chloroform under nitrogen. 58.4 g of m-tetramethylxylylene diisocyanate are added homogeneously to this mixture within 30 minutes. After addition has ended, the mixture is stirred at room temperature for another 30 minutes and then the solvent is removed under reduced pressure. The remaining product is washed repeatedly with n-hexane and finally dried under reduced pressure. 114.6 g of the reaction product are obtained as a white solid.

Compound B9:

In a dry 1 l three-neck flask with stirrer, internal thermometer and reflux condenser with pressure equalizer and dropping funnel, 72.7 g of 2-ethylhexylamine are mixed with 500 ml of tetrahydrofuran under nitrogen. 47.3 g of 1,6-hexamethylene diisocyanate are added homogeneously to this mixture within 30 minutes. After addition has ended, the mixture is stirred at room temperature for another 30 minutes and then the solvent is removed under reduced pressure. The remaining product is washed repeatedly with n-hexane and finally dried under reduced pressure. 115.7 g of the reaction product are obtained as a white solid.

Compound B10:

In a dry 1 l three-neck flask with stirrer, internal thermometer and reflux condenser with pressure equalizer and dropping funnel, 64.5 g of 2-ethylhexylamine are mixed with 500 ml of tetrahydrofuran under nitrogen. 55.5 g of isophorone diisocyanate are added homogeneously to this mixture within 30 minutes. After addition has ended, the mixture is stirred at room temperature for another 30 minutes and then the solvent is removed under reduced pressure. The remaining product is washed repeatedly with n-hexane and finally dried under reduced pressure. 118.2 g of the reaction product are obtained as a white solid.

EXAMPLE 1 (B1)

Preparation of Component (B) in the Presence of the Thermoplastic Silicone Elastomer (A)

Under a nitrogen atmosphere, a solution of 120 g of a thermoplastic silicone elastomer based on methylenebis(4-isocyanatocyclohexane) (commercially available under the GENIOMER® 140 name from Wacker Chemie AG, Munich, Germany) in 700 ml of chloroform is prepared in a 2 l three-neck flask with stirrer, reflux condenser and internal thermometer. To this are added 4.77 g of butylamine and, after heating to 60° C., 8.56 g of methylenebis(4-isocyanatocyclohexane) are added dropwise from a dropping funnel within 30 minutes. The resulting mixture is stirred under reflux for 30 minutes. After cooling, the solution is left to stand at room temperature for 2 h. Subsequently, the reaction mixture is poured into PTFE molds (diameter 20 cm, depth 2 mm) and left to stand in a fume hood for days in order to evaporate the solvent. After evaporation of the solvent, the product is clear, tack-free and elastomeric. These slabs are used to conduct tests to determine the mechanical properties and to determine the molecular weight distribution (by GPC analysis). The results can be found in table 1.

EXAMPLE 2 (B2)

Preparation of Component (B) in the Presence of the Thermoplastic Silicone Elastomer (A)

Under a nitrogen atmosphere, a solution of 120 g of a thermoplastic silicone elastomer based on m-tetramethylxylylene diisocyanate (commercially available under the GENIOMER® 200 name from Wacker Chemie AG, Munich, Germany) in 600 ml of chloroform is prepared in a 2 l three-neck flask with stirrer, reflux condenser and internal thermometer. To this are added 4.99 g of butylamine and, after heating to 60° C., 8.34 g of m-tetramethylxylylene diisocyanate are added dropwise from a dropping funnel within 30 minutes. The resulting mixture is stirred under reflux for 30 minutes. After cooling, the solution is left to stand at room temperature for 2 h. Subsequently, the reaction mixture is poured into PTFE molds (diameter 20 cm, depth 2 mm) and left to stand in a fume hood for 2 days in order to evaporate the solvent. After evaporation of the solvent, the product is clear, tack-free and elastomeric. These slabs are used to conduct tests to determine the mechanical properties and to determine the molecular weight distribution (by GPC analysis). The results can be found in table 1.

EXAMPLE 3 (B3)

Preparation of Component (B) in the Presence of the Thermoplastic Silicone Elastomer (A)

Under a nitrogen atmosphere, a solution of 120 g of a thermoplastic silicone elastomer based on isophorone diisocyanate (commercially available under the GENIOMER® 80 name from Wacker Chemie AG, Munich, Germany) in 1100 ml of tetrahydrofuran is prepared in a 2 l three-neck flask with stirrer, reflux condenser and internal thermometer. To this are added 5.29 g of butylamine and, after heating to 60° C., 8.04 g of isophorone diisocyanate are added dropwise from a dropping funnel within 30 minutes. The resulting mixture is stirred under reflux for 30 minutes. After cooling, the solution is left to stand at room temperature for 2 h. Subsequently, the reaction mixture is poured into PTFE molds (diameter 20 cm, depth 2 mm) and left to stand in a fume hood for 2 days in order to evaporate the solvent. After evaporation of the solvent, the product is clear, tack-free and elastomeric. These slabs are used to conduct tests to determine the mechanical properties and to determine the molecular weight distribution (by GPC analysis). The results can be found in table 1.

EXAMPLE 4 (B4)

Preparation of the Thermoplastic Silicone Elastomer (A) in the Presence of Component (B)

13.33 g of compound B1 are dissolved in 850 ml of tetrahydrofuran under a nitrogen atmosphere in a 2 l three-neck flask with stirrer, reflux condenser and internal thermometer. To this are added 109.1 g of an α,ω-aminopropyl-functional polydimethylsiloxane with a mean molar mass of approx. 2600 g/mol (commercially available under the "FLUID NH 40 D" name from Wacker Chemie AG, Munich, Germany). Subsequently, the mixture is heated to 60° C. and a solution of 11.06 g of methylenebis(4-isocyanatocyclohexane) in 150 ml of tetrahydrofuran is added from a dropping funnel within 30 minutes. After addition has ended, the reaction is completed by continuing to stir at 60° C. for another 30 minutes. After cooling, the solution is left to stand at room temperature for 2 h. Subsequently, the reaction mixture is poured into PTFE molds (diameter 20 cm, depth 2 mm) and left to stand in a fume hood for days in order to evaporate the solvent. After evaporation of the solvent, the product is clear, tack-free and elastomeric. These slabs are used to conduct tests to determine the mechanical properties and to determine the molecular weight distribution (by GPC analysis). The results can be found in table 1.

EXAMPLE 5 (B5)

Preparation of the Thermoplastic Silicone Elastomer (A) in the Presence of Component (B)

13.33 g of compound B2 are dissolved in 1050 ml of tetrahydrofuran under a nitrogen atmosphere in a 2 l three-neck flask with stirrer, reflux condenser and internal thermometer. To this are added 110 g of an α,ω-aminopropyl-functional polydimethylsiloxane with a mean molar mass of approx. 2600 g/mol (commercially available under the "FLUID NH 40 D" name from Wacker Chemie AG, Munich, Germany). Subsequently, the mixture is heated to 60° C. and a solution of 10.39 g of m-tetramethylxylylene diisocyanate in 200 ml of tetrahydrofuran is added from a dropping funnel within 30 minutes. After addition has ended, the reaction is completed by continuing to stir at 60° C. for another 30 minutes. After cooling, the solution is left to stand at room temperature for 2 h. Subsequently, the reaction mixture is poured into PTFE molds (diameter 20 cm, depth 2 mm) and left to stand in a fume hood for 2 days in order to evaporate the solvent. After evaporation of the solvent, the product is clear, tack-free and elastomeric. These slabs are used to conduct tests to determine the mechanical properties and to determine the molecular weight distribution (by GPC analysis). The results can be found in table 1.

EXAMPLE 6 (B6)

Preparation of the Thermoplastic Silicone Elastomer (A) in the Presence of Component (B)

13.33 g of compound B3 are dissolved in 850 ml of chloroform under a nitrogen atmosphere in a 2 l three-neck flask with stirrer, reflux condenser and internal thermometer. To this are added 110.5 g of an α,ω-aminopropyl-functional polydimethylsiloxane with a mean molar mass of approx. 2600 g/mol (commercially available under the "FLUID NH 40 D" name from Wacker Chemie AG, Munich, Germany). Subsequently, the mixture is heated to 60° C. and a solution of 9.50 g of isophorone diisocyanate in 150 ml of tetrahydrofuran is added from a dropping funnel within 30 minutes. After addition has ended, the reaction is completed by continuing to stir at 60° C. for another 30 minutes. After cooling, the solution is left to stand at room temperature for 2 h. Subsequently, the reaction mixture is poured into PTFE molds (diameter 20 cm, depth 2 mm) and left to stand in a fume hood for 2 days in order to evaporate the solvent. After evaporation of the solvent, the product is clear, tack-free and elastomeric. These slabs are used to conduct tests to determine the mechanical properties and to determine the molecular weight distribution (by GPC analysis). The results can be found in table 1.

COMPARATIVE EXAMPLE 1 (C1)

Preparation of a Thermoplastic Silicone Elastomer with the Same Molecular Composition as that in Example 1

In a 2 l three-neck flask with stirrer, reflux condenser and internal thermometer, 109.1 g of an α,ω-aminopropyl-functional polydimethylsiloxane with a mean molar mass of approx. 2600 g/mol (commercially available under the "FLUID NH 40 D" name from Wacker Chemie AG, Munich, Germany) and 4.77 g of butylamine are dissolved in 400 ml of chloroform. Subsequently, the mixture is heated to 60° C. and a solution of 19.62 g of methylenebis(4-isocyanatocyclohexane) in 200 ml of chloroform is added from a dropping funnel within 30 minutes. After addition has ended, the reaction is completed by continuing to stir at 60° C. for another 30 minutes. After cooling, the solution is left to stand at room temperature for 2 h. Subsequently, the reaction mixture is poured into PTFE molds (diameter 20 cm, depth 2 mm) and left to stand in a fume hood for 2 days in order to evaporate the solvent. After evaporation of the solvent, the product is clear and tack-free, but brittle rather than elastomeric. The slabs obtained are used to conduct tests to determine the mechanical properties and to determine the molecular weight distribution (by GPC analysis). The results can be found in table 1.

EXAMPLE 7 (B7)

Compounding of the Thermoplastic Silicone Elastomer (A) with Component (B)

900 g of a thermoplastic silicone elastomer based on methylenebis(4-isocyanatocyclohexane) (commercially available under the GENIOMER® 140 name from Wacker Chemie AG, Munich, Germany) in the form of granules of diameter 3-4 mm are mixed with 100 g of compound B1 in a plastic beaker. The mixture thus obtained is metered by means of a solid metering system into zone 1 of a corotary twin-shaft kneader (Leistritz ZSE 18 HP-45D; temperature distribution: intake: 13° C.; zone 1: 120° C.; zone 2: 130° C.; zone 3-4: 170° C., 5: 160° C., 6: 150° C., 7: 140° C., 8: 145° C.; nozzle: 150° C.; screw speed: 150 rpm). The resulting product is extruded as a clear extrudant and conducted through a cooling bath into a pelletization step. 100 g of the pellets thus obtained are dissolved in 1000 ml of tetrahydrofuran, poured into PTFE molds (diameter 20 cm, depth 2 mm) and left to stand in a fume hood for 2 days in order to evaporate the solvent. After evaporation of the solvent, the products are clear, tack-free and elastomeric. These slabs are used to conduct tests to determine the mechanical properties and to determine the molecular weight distribution (by GPC analysis). The results can be found in table 1.

EXAMPLE 8 (B8)

Preparation of Component (B) in the Presence of the Thermoplastic Silicone Elastomer (A)

Under a nitrogen atmosphere, a solution of 120 g of a thermoplastic silicone elastomer based on methylenebis(4-isocyanatocyclohexane) (commercially available under the GENIOMER® 140 name from Wacker Chemie AG, Munich, Germany) in 700 ml of tetrahydrofuran is prepared in a 2 l three-neck flask with stirrer, reflux condenser and internal thermometer. To this are added 3.91 g of ethanol and 100 mg of dibutyltin dilaurate and, after heating to 60° C., 9.43 g of methylenebis(4-isocyanatocyclohexane) are added dropwise from a dropping funnel within 30 minutes. The resulting mixture is stirred under reflux for 2 hours. After cooling, the solution is left to stand at room temperature for 2 h. Subsequently, the reaction mixture is poured into PTFE molds (diameter 20 cm, depth 2 mm) and left to stand in a fume hood for 2 days in order to evaporate the solvent. After evaporation of the solvent, the product is opaque, tack-free and elastomeric. These slabs are used to conduct tests to determine the mechanical properties and to determine the molecular weight distribution (by GPC analysis). The results can be found in table 1.

EXAMPLE 9 (B9)

Preparation of Component (B) in the Presence of the Thermoplastic Silicone Elastomer (A)

Under a nitrogen atmosphere, a solution of 120 g of a thermoplastic silicone elastomer based on m-tetramethylxylylene diisocyanate (commercially available under the GENIOMER® 200 name from Wacker Chemie AG, Munich, Germany) in 1000 ml of tetrahydrofuran is prepared in a 2 l three-neck flask with stirrer, reflux condenser and internal thermometer. To this are added 3.65 g of ethanol and 100 mg of dibutyltin dilaurate and, after heating to 60° C., 9.68 g of m-tetramethylxylylene diisocyanate are added dropwise from a dropping funnel within 30 minutes. The resulting mixture is stirred under reflux for 2 hours. After cooling, the solution is left to stand at room temperature for 2 h. Subsequently, the reaction mixture is poured into PTFE molds (diameter 20 cm, depth 2 mm) and left to stand in a fume hood for 2 days in order to evaporate the solvent. After evaporation of the solvent, the product is clear, tack-free and elastomeric. These slabs are used to conduct tests to determine the mechanical properties and to determine the molecular weight distribution (by GPC analysis). The results can be found in table 1.

EXAMPLE 10 (B10)

Preparation of Component (B) in the Presence of the Thermoplastic Silicone Elastomer (A)

Under a nitrogen atmosphere, a solution of 120 g of a thermoplastic silicone elastomer based on isophorone diisocyanate (commercially available under the GENIOMER® 80 name from Wacker Chemie AG, Munich, Germany) in 1100 ml of tetrahydrofuran is prepared in a 2 l three-neck flask with stirrer, reflux condenser and internal thermometer. To this are added 3.47 g of ethanol and 100 mg of dibutyltin dilaurate and, after heating to 60° C., 9.86 g of isophorone diisocyanate are added dropwise from a dropping funnel within 30 minutes. The resulting mixture is stirred under reflux for 2 hours. After cooling, the solution is left to stand at room temperature for 2 h. Subsequently, the reaction mixture is poured into PTFE molds (diameter 20 cm, depth 2 mm) and left to stand in a fume hood for 2 days in order to evaporate the solvent. After evaporation of the solvent, the product is clear, tack-free and elastomeric. These slabs are used to conduct tests to determine the mechanical properties and to determine the molecular weight distribution (by GPC analysis). The results can be found in table 1.

EXAMPLE 11 (B11)

Preparation of Component (B) in the Presence of the Thermoplastic Silicone Elastomer (A)

Under a nitrogen atmosphere, a solution of 120 g of a thermoplastic silicone elastomer based on methylenebis(4-isocyanatocyclohexane) (commercially available under the GENIOMER® 140 name from Wacker Chemie AG, Munich, Germany) in 1200 ml of tetrahydrofuran is prepared in a 2 l three-neck flask with stirrer, reflux condenser and internal thermometer. To this are added 4.99 g of butylamine and, after heating to 60° C., a solution of 8.34 g of m-tetramethylxylylene diisocyanate in 50 ml of tetrahydrofuran are added dropwise from a dropping funnel within 30 minutes. The resulting mixture is stirred under reflux for 30 minutes. After cooling, the solution is left to stand at room temperature for 2 h. Subsequently, the reaction mixture is poured into PTFE molds (diameter 20 cm, depth 2 mm) and left to stand in a fume hood for 2 days in order to evaporate the solvent. After evaporation of the solvent, the product is clear, tack-free and elastomeric. These slabs are used to conduct tests to determine the mechanical properties and to determine the molecular weight distribution (by GPC analysis). The results can be found in table 1.

EXAMPLE 12 (B12)

Preparation of Component (B) in the Presence of the Thermoplastic Silicone Elastomer (A)

Under a nitrogen atmosphere, a solution of 120 g of a thermoplastic silicone elastomer based on m-tetramethylxylylene diisocyanate (commercially available under the GENIOMER® 200 name from Wacker Chemie AG, Munich, Germany) in 550 ml of tetrahydrofuran is prepared in a 2 l three-neck flask with stirrer, reflux condenser and internal thermometer. To this are added 5.29 g of butylamine and, after heating to 60° C., a solution of 8.04 g of isophorone diisocyanate in 50 ml tetrahydrofuran are added dropwise from a dropping funnel within 30 minutes. The resulting mixture is stirred under reflux for 30 minutes. After cooling, the solution is left to stand at room temperature for 2 h. Subsequently, the reaction mixture is poured into PTFE molds (diameter 20 cm, depth 2 mm) and left to stand in a fume hood for 2 days in order to evaporate the solvent. After evaporation of the solvent, the product is clear, tack-free and elastomeric. These slabs are used to conduct tests to determine the mechanical properties and to determine the molecular weight distribution (by GPC analysis). The results can be found in table 1.

EXAMPLE 13 (B13)

Preparation of Component (B) in the Presence of the Thermoplastic Silicone Elastomer (A)

Under a nitrogen atmosphere, a solution of 120 g of a thermoplastic silicone elastomer based on isophorone diisocyanate (commercially available under the GENIOMER® 80 name from Wacker Chemie AG, Munich, Germany) in 1100 ml of tetrahydrofuran is prepared in a 2 l three-neck flask with stirrer, reflux condenser and internal thermometer. To this are added 4.77 g of butylamine and, after heating to 60° C., a solution of 8.56 g of methylenebis(4-isocyanatocyclohexane) in 100 ml of THF are added dropwise from a dropping funnel within 30 minutes. The resulting mixture is stirred under reflux for 30 minutes. After cooling, the solution is left to stand at room temperature for 2 h. Subsequently, the reaction mixture is poured into PTFE molds (diameter 20 cm, depth 2 mm) and left to stand in a fume hood for 2 days in order to evaporate the solvent. After evaporation of the solvent, the product is clear, tack-free and elastomeric. These slabs are used to conduct tests to determine the mechanical properties and to determine the molecular weight distribution (by GPC analysis). The results can be found in table 1.

COMPARATIVE EXAMPLE 2 (C2)

120 g of a thermoplastic silicone elastomer based on methylenebis(4-isocyanatocyclohexane) (commercially available under the GENIOMER® 140 name from Wacker Chemie AG, Munich, Germany) are dissolved in 1200 ml of tetrahydrofuran in a 2 l flask. The solution thus obtained is poured into PTFE molds (diameter 20 cm, depth 2 mm) and left to stand in a fume hood for 2 days in order to evaporate the solvent. After evaporation of the solvent, the product is clear, tack-free and elastomeric. These slabs are used to conduct tests to determine the mechanical properties and to determine the molecular weight distribution (by GPC analysis). The results can be found in table 1.

COMPARATIVE EXAMPLE 3 (C3)

120 g of a thermoplastic silicone elastomer based on m-tetramethylxylylene diisocyanate (commercially available under the GENIOMER® 200 name from Wacker Chemie AG, Munich, Germany) are dissolved in 600 ml of chloroform in a 2 l flask. The solution thus obtained is poured into PTFE molds (diameter 20 cm, depth 2 mm) and left to stand in a fume hood for 2 days in order to evaporate the solvent. After evaporation of the solvent, the product is clear, tack-free and elastomeric. These slabs are used to conduct tests to determine the mechanical properties and to determine the molecular weight distribution (by GPC analysis). The results can be found in table 1.

COMPARATIVE EXAMPLE 4 (C4)

120 g of a thermoplastic silicone elastomer based on isophorone diisocyanate (commercially available under the GENIOMER® 80 name from Wacker Chemie AG, Munich, Germany) are dissolved in 1000 ml of tetrahydrofuran in a 2 l flask. The solution thus obtained is poured into PTFE molds (diameter 20 cm, depth 2 mm) and left to stand in a fume hood for 2 days in order to evaporate the solvent. After evaporation of the solvent, the product is clear, tack-free and elastomeric. These slabs are used to conduct tests to determine the mechanical properties and to determine the molecular weight distribution (by GPC analysis). The results can be found in table 1.

TABLE 1

| No. | Hardness [Shore A] | Tensile strength [MPa] | Stress at 100% elongation [MPa] | Elongation at break [%] | Mp [g/mol][1] |
|---|---|---|---|---|---|
| B1 | 73 | 12.4 | 2.89 | 645 | 118455/587 |
| B2 | 72 | 9.1 | 3.58 | 527 | 131062/500 |
| B3 | 53 | 12.2 | 1.41 | 687 | 168275/505 |
| B4 | 71 | 11.6 | 2.58 | 620 | 130561/589 |
| B5 | 72 | 8.5 | 3.62 | 531 | 143897/502 |
| B6 | 55 | 11.6 | 1.67 | 697 | 172364/499 |
| B7 | 65 | 8.6 | 2.18 | 637 | 67163/544 |
| B8 | 57 | 8.3 | 1.74 | 612 | 117016/494 |
| B9 | 70 | 5.6 | 2.83 | 563 | 171224/483 |
| B10 | 50 | 8.9 | 1.34 | 621 | 168495/682 |
| B11 | 86 | 6.9 | 4.75 | 409 | 102696/499 |
| B12 | 78 | 4.3 | 2.98 | 664 | 131734/493 |
| B13 | 48 | 9.1 | 1.61 | 548 | 164231/587 |
| C1 | 67 | 2.1 | —[2] | 14 | 73016 |
| C2 | 56 | 7.1 | 1.7 | 561 | 103518 |
| C3 | 67 | 4.4 | 2.58 | 604 | 134211 |
| C4 | 48 | 8.6 | 1.2 | 642 | 177791 |

[1]The larger number is the molecular weight of component (A), the smaller number the molecular weight of component (B).
[2]No figure possible since the elongation at break is only 14%

EXAMPLE 14 (B14)

In a 500 ml three-neck flask with stirrer, dropping funnel, internal thermometer and reflux condenser, 5.96 g of 2-ethylhexylamine are dissolved in 50 ml of chloroform, and a solution of 6.04 g of methylenebis(4-isocyanatohexane) in 50 ml of chloroform is added dropwise to this mixture within 30 minutes. After addition has ended, the mixture is stirred at ambient temperature for another 30 minutes to obtain a solution of component (B).

In a 2 l three-neck flask with stirrer, dropping funnel, internal thermometer and reflux condenser, 111.34 g of an α,ω-aminopropyl-functional polydimethylsiloxane with a mean molar mass of approx. 11000 g/mol (commercially available under the "FLUID NH 165 D" name from Wacker Chemie AG, Munich, Germany) are dissolved in 900 ml of tetrahydrofuran. Subsequently, the mixture is heated to 60° C. and a solution of 2.66 g of methylenebis(4-isocyanatohexane) in 50 ml of tetrahydrofuran is added from a dropping funnel within 30 minutes. After addition has ended, the reaction is completed by continuing to stir at 60° C. for another 30 minutes. Thereafter, the above-described solution of component (B) is added dropwise within 30 minutes. After addition has ended, the solution is left to cool and then to stand at room temperature for 2 h. Subsequently, the reaction mixture is poured into PTFE molds (diameter 20 cm, depth 2 mm) and left to stand in a fume hood for 2 days in order to evaporate the solvent. After evaporation of the solvent, the product is clear, tack-free and elastomeric. These slabs are used to conduct tests to determine the mechanical properties and to determine the molecular weight distribution (by GPC analysis). The results can be found in table 2.

EXAMPLE 15 (B15)

In a 500 ml three-neck flask with stirrer, dropping funnel, internal thermometer and reflux condenser, 2.98 g of 2-ethylhexylamine are dissolved in 25 ml of chloroform, and a solution of 3.02 g of methylenebis(4-isocyanatohexane) in 25 ml of chloroform is added dropwise to this mixture within 30 minutes. After addition has ended, the mixture is stirred at ambient temperature for another 30 minutes to obtain a solution of component (B).

In a 2 l three-neck flask with stirrer, dropping funnel, internal thermometer and reflux condenser, 111.34 g of an α,ω-aminopropyl-functional polydimethylsiloxane with a mean molar mass of approx. 11000 g/mol (commercially available under the "FLUID NH 165 D" name from Wacker Chemie AG, Munich, Germany) are dissolved in 900 ml of tetrahydrofuran. Subsequently, the mixture is heated to 60° C. and a solution of 2.66 g of methylenebis(4-isocyanatohexane) in 50 ml of tetrahydrofuran is added from a dropping funnel within 30 minutes. After addition has ended, the reaction is completed by continuing to stir at 60° C. for another 30 minutes. Thereafter, the above-described solution of component (B) is added dropwise within 30 minutes. After addition has ended, the solution is left to cool and then to stand at room temperature for 2 h. Subsequently, the reaction mixture is poured into PTFE molds (diameter 20 cm, depth 2 mm) and left to stand in a fume hood for 2 days in order to evaporate the solvent. After evaporation of the solvent, the product is clear, tack-free and elastomeric. These slabs are used to conduct tests to determine the mechanical properties and to determine the molecular weight distribution (by GPC analysis). The results can be found in table 2.

EXAMPLE 16 (B16)

In a 500 ml three-neck flask with stirrer, dropping funnel, internal thermometer and reflux condenser, 1.19 g of 2-ethylhexylamine are dissolved in 10 ml of chloroform, and a solution of 1.21 g of methylenebis(4-isocyanatohexane) in 10 ml of chloroform is added dropwise to this mixture within 30 minutes. After addition has ended, the mixture is stirred at ambient temperature for another 30 minutes to obtain a solution of component (B).

In a 2 l three-neck flask with stirrer, dropping funnel, internal thermometer and reflux condenser, 111.34 g of an α,ω-aminopropyl-functional polydimethylsiloxane with a mean molar mass of approx. 11 000 g/mol (commercially available under the "FLUID NH 165 D" name from Wacker Chemie AG, Munich, Germany) are dissolved in 900 ml of tetrahydrofuran. Subsequently, the mixture is heated to 60° C. and a solution of 2.66 g of methylenebis(4-isocyanatohexane) in 50 ml of tetrahydrofuran is added from a dropping funnel within 30 minutes. After addition has ended, the reaction is completed by continuing to stir at 60° C. for another 30 minutes. Thereafter, the above-described solution of component (B) is added dropwise within 30 minutes. After addition has ended, the solution is left to cool and then to stand at room temperature for 2 h. Subsequently, the reaction mixture is poured into PTFE molds (diameter 20 cm, depth 2 mm) and left to stand in a fume hood for 2 days in order to evaporate the solvent. After evaporation of the solvent, the product is clear, tack-free and elastomeric. These slabs are used to conduct tests to determine the mechanical properties and to determine the molecular weight distribution (by GPC analysis). The results can be found in table 2.

EXAMPLE 17 (B17)

In a 500 ml three-neck flask with stirrer, dropping funnel, internal thermometer and reflux condenser, 0.60 g of 2-ethylhexylamine are dissolved in 10 ml of chloroform, and a solution of 0.60 g of methylenebis(4-isocyanatohexane) in 10 ml of chloroform is added dropwise to this mixture within 30 minutes. After addition has ended, the mixture is stirred at ambient temperature for another 30 minutes to obtain a solution of component (B).

In a 2 l three-neck flask with stirrer, dropping funnel, internal thermometer and reflux condenser, 111.34 g of an α,ω-aminopropyl-functional polydimethylsiloxane with a mean molar mass of approx. 11000 g/mol (commercially available under the "FLUID NH 165 D" name from Wacker Chemie AG, Munich, Germany) are dissolved in 900 ml of tetrahydrofuran. Subsequently, the mixture is heated to 60° C. and a solution of 2.66 g of methylenebis(4-isocyanatohexane) in 50 ml of tetrahydrofuran is added from a dropping funnel within 30 minutes. After addition has ended, the reaction is completed by continuing to stir at 60° C. for another 30 minutes. Thereafter, the above-described solution of component (B) is added dropwise within 30 minutes. After addition has ended, the solution is left to cool and then to stand at room temperature for 2 h. Subsequently, the reaction mixture is poured into PTFE molds (diameter 20 cm, depth 2 mm) and left to stand in a fume hood for 2 days in order to evaporate the solvent. After evaporation of the solvent, the product is clear, tack-free and elastomeric. These slabs are used to conduct tests to determine the mechanical properties and to determine the molecular weight distribution (by GPC analysis). The results can be found in table 2.

COMPARATIVE EXAMPLE 5 (C5)

In a 2 l three-neck flask with stirrer, dropping funnel, internal thermometer and reflux condenser, 111.34 g of an α,ω-aminopropyl-functional polydimethylsiloxane with a mean molar mass of approx. 11000 g/mol (commercially available under the "FLUID NH 165 D" name from Wacker Chemie AG, Munich, Germany) are dissolved in 900 ml of tetrahydrofuran. Subsequently, the mixture is heated to 60° C. and a solution of 2.66 g of methylenebis(4-isocyanatohexane) in 50 ml of tetrahydrofuran is added from a dropping funnel within 30 minutes. After addition has ended, the reaction is completed by continuing to stir at 60° C. for another 30 minutes. Thereafter, the solution is left to cool and then to stand at room temperature for 2 h. Subsequently, the reaction mixture is poured into PTFE molds (diameter 20 cm, depth 2 mm) and left to stand in a fume hood for 2 days in order to evaporate the solvent. After evaporation of the solvent, the product is clear, tack-free and elastomeric. These slabs are used to conduct tests to determine the mechanical properties and to determine the molecular weight distribution (by GPC analysis). The results can be found in table 2.

TABLE 2

| No. | Hardness [Shore A] | Tensile strength [MPa] | Stress at 100% elongation [MPa] | Elongation at break [%] | Mp [g/mol][1] | Content of component (B) [% by wt.] |
|---|---|---|---|---|---|---|
| C5 | 30 | 2.82 | 0.59 | 754 | 528762 | 0 |
| B14 | 38 | 5.17 | 0.84 | 821 | 755800/836 | 10 |
| B15 | 35 | 4.23 | 0.71 | 627 | 726316/843 | 5 |
| B16 | 32 | 3.43 | 0.72 | 715 | 637079/892 | 2 |
| B17 | 32 | 2.91 | 0.68 | 589 | 598779/876 | 1 |

[1] The larger number is the molecular weight of component (A), the smaller number the molecular weight of component (B).

The invention claimed is:

1. A composition comprising
  (A) at least one copolymer of the formula (1)

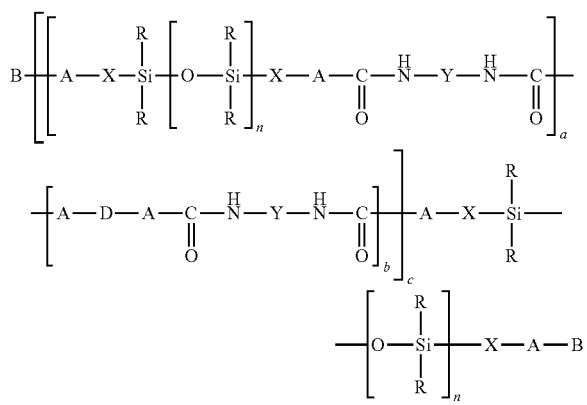

and
  (B) at least one compound of the formula (2)

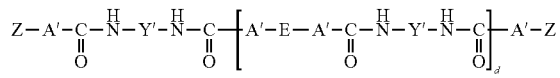

in which
  R are the same or different and are hydrogen or a monovalent SiC-bonded, optionally substituted hydrocarbyl radical,
  Y are the same or different and are divalent, optionally substituted hydrocarbyl radicals, X are the same or different and are divalent SiC-bonded, optionally substituted hydrocarbyl radicals which are optionally interrupted by oxygen atoms, A are the same or different and are oxygen, sulfur, or an amino group —$NR^1$—, $R^1$ are the same or different and are hydrogen or an optionally substituted hydrocarbyl radical, D are the same or different and are an alkylene radical which is optionally substituted by halogen, $C_1$-$C_6$-alkyl or $C_1$-$C_6$-alkyl ester and has 1 to 700 carbon atoms, in which mutually nonadjacent methylene units are optionally replaced by —O—, —COO—, —OCO— or —OCOO— groups, B are the same or different and are hydrogen, an OCN—Y—NH—CO— radical, an $H_2N$—Y—NH—CO— radical, an $R^2$-A-CO—NH—Y—NH—CO— radical or an $R_3Si$—(O—$SiR_2$)$_n$—X-A-CO—NH—Y—NH—CO— radical, $R^2$ are the same or different and are a monovalent, optionally silyl-substituted hydrocarbyl radical, A' are the same or different and has a definition given for A, Z are the same or different and are monovalent, optionally substituted hydrocarbyl radicals or monovalent organosilicon radicals, Y' are the same or different and has a definition given for Y, E are the same or different and are divalent, optionally substituted hydrocarbyl radicals, n is an integer from 1 to 4000, a is an integer of at least 1, b is an integer from 0 to 40, c is an integer of at least 1 and d is an integer from 0 to 5, with the proviso that, in compound of the formula (1), the a blocks and b blocks may be randomly distributed in the polymer.

2. The composition of claim 1, wherein b is 0.

3. The composition of claim 1, wherein d is 0.

4. The composition of claim 2, wherein d is 0.

5. The composition of claim 1, wherein compounds of the formula (2) have a molecular weight of up to 5000.

6. The composition of claim 2, wherein compounds of the formula (2) have a molecular weight of up to 5000.

7. The composition of claim 3, wherein compounds of the formula (2) have a molecular weight of up to 5000.

8. The composition of claim 1, wherein component (B) is present in an amount of 0.1 to 40 parts by weight, based on 100 parts by weight of component (A).

9. The composition of claim 1, wherein the composition further comprises one or more of organic solvents (C), UV stabilizers (D), antioxidants (E) and fillers (F).

10. A process for producing a composition of claim 1, wherein components (A) and (B) and optionally further components (D), UV stabilizers, (E), antioxidants, and (F), fillers, are mixed thoroughly with organic solvent (C) in any sequence.

11. A process for producing a compositions of claim 1, wherein components (A), (B) and optionally (D), UV stabilizers, (E), antioxidants, and (F), fillers, are mixed with one another.

12. The process as claimed in claim 10, wherein component (A) is prepared in situ.

13. The process of claim 10, wherein component (B) is prepared in situ.

* * * * *